US008917018B2

(12) United States Patent
Belgorodsky et al.

(10) Patent No.: US 8,917,018 B2
(45) Date of Patent: Dec. 23, 2014

(54) NANOMATRIX SEPARATION OF CHROMOPHORES AND USES THEREOF IN LUMINESCENT DEVICES

(75) Inventors: Bogdan Belgorodsky, Ashkelon (IL); Eyal Drug, Petach Tiqwa (IL); Ludmila Fadeev, Kiryat Ono (IL); Netta Hendler, Tel Aviv (IL); Elad Mentovich, Haifa (IL); Shachar Richter, Mazkeret Batia (IL); Michael Gozin, Tel Aviv (IL)

(73) Assignee: Ramot at Tel-Aviv University Ltd. (IL)

( * ) Notice: Subject to any disclaimer, the term of this patent is extended or adjusted under 35 U.S.C. 154(b) by 609 days.

(21) Appl. No.: 13/009,255

(22) Filed: Jan. 19, 2011

(65) Prior Publication Data

US 2011/0215716 A1    Sep. 8, 2011

Related U.S. Application Data

(60) Provisional application No. 61/282,309, filed on Jan. 19, 2010.

(51) Int. Cl.
| H01J 1/62 | (2006.01) |
| B32B 9/04 | (2006.01) |
| B05D 5/12 | (2006.01) |
| G02B 5/23 | (2006.01) |
| B82Y 30/00 | (2011.01) |

(52) U.S. Cl.
CPC ... *B05D 5/12* (2013.01); *B32B 9/04* (2013.01); *G02B 5/23* (2013.01); *H01J 1/62* (2013.01); *B82Y 30/00* (2013.01)

USPC .......... 313/512; 428/690; 428/703; 313/498; 427/58

(58) Field of Classification Search
None
See application file for complete search history.

(56) References Cited

U.S. PATENT DOCUMENTS

| 2004/0018380 | A1* | 1/2004 | Aziz et al. .................... 428/690 |
| 2006/0079455 | A1* | 4/2006 | Gazit et al. .................... 514/12 |
| 2007/0275265 | A1* | 11/2007 | Liu .............................. 428/690 |

OTHER PUBLICATIONS

Pulickel M. Ajayan, "Nanotube composites", Nature, vol. 447, Jun. 28, 2007.
Bogdan Belgorodsky, "Formation of a Soluble Stable Complex between Pristine C60-Fullerene and a Native Blood Protein", ChemBioChem 2006, 7, 1783-1789.
Xing Chen,"Biomimetic Engineering of Carbon Nanotubes by Using Cell Surface Mucin Mimics", Angew. Chem. Int. Ed. 2004, 43, 6112-6116.
Yuichi Hino, "Transient characteristics of polyfluorene-based polymer light-emitting diodes and their application for color tunable devices", Thin Solid Films 499 (2006) 359-363.
Joe C. Hong, "Alkali-catalyzed b-elimination of periodate-oxidized glycans: A novel method of chemical deglycosylation of mucin gene products in paraffin embedded sections", Glycoconjugate Journal 17, 691-703, 2000.
C. N. Murthy, et al., "The water-soluble b-cyclodextrin-[60]fullerene complex", Chem. Communication., 2001, 1194-1195.

* cited by examiner

*Primary Examiner* — J. L. Yang
(74) *Attorney, Agent, or Firm* — Cantor Colburn LLP

(57) ABSTRACT

A system and process for controlling electronic interactions between two or more interactable materials.

28 Claims, 30 Drawing Sheets

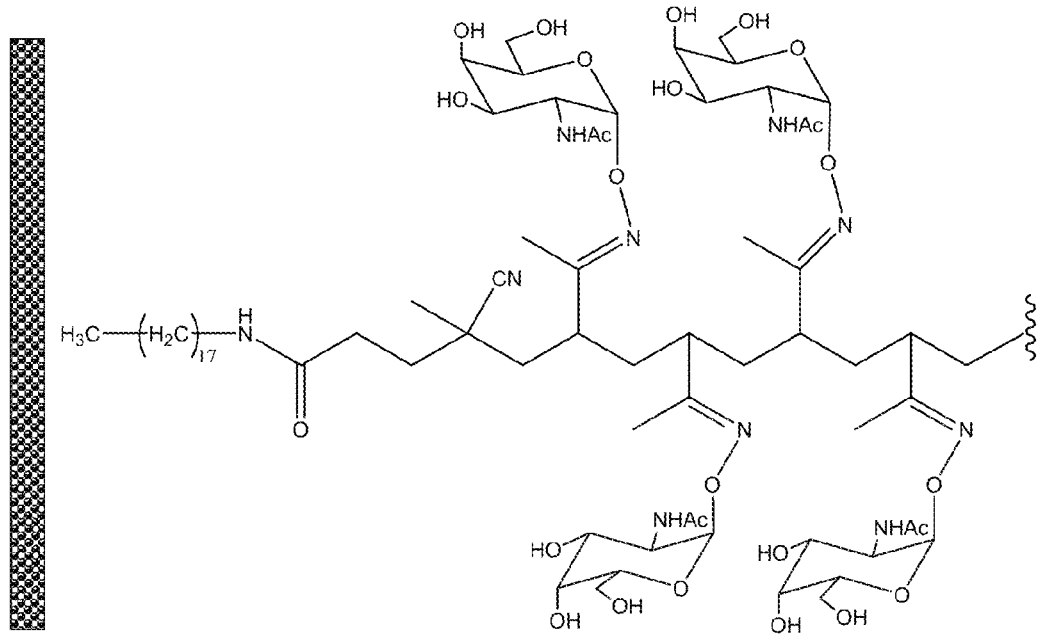
Figure 1 - Prior art

NANOMATRIX SEPARATION OF CHROMOPHORES AND USES THEREOF IN LUMINESCENT DEVICES

FIELD OF THE INVENTION

This invention relates generally to a system and process for controlling electronic interactions between two or more interactable materials.

BACKGROUND OF THE INVENTION

The production of organic white light emitting devices is one of the main technological and scientific challenges. This is due to the fact that the creation of white light from a single component is considered an extremely difficult mission. Regularly, white light emission is achieved by employing a mix of the three primary dyes which emit in red, green, and blue. However, proximate color elements may undergo electronic interaction leading to a change in the optical profile e.g., nonradiative emission/decay. As previously was shown [1] electron transfer between dye molecules is ultra sensitive to the distance between them. At a short distance, formation of the Förster Resonance Energy Transfer (FRET) process may take place, which eliminates the emission of one of the components in a mixed system.

There are several approaches to reduce electronic interaction between molecules, e.g., creation of multilayers of dyes in which each layer is comprised of single type of dye, or by the synthesis of an inorganic separating matrix material in which the different emitting compounds can be mixed without interaction (matrix-filler materials). While these inorganic matrix systems are the leading candidates to prepare flexible, processable and low-cost devices, the fabrication process of such systems is highly affected by many factors such as humidity, temperature and concentration.

Hydrophobic materials, such as fullerenes, experience rejection in hydrophilic environment; however, this can be overcome by chemically modifying their surfaces [2]. Although, Fullerenes are practically insoluble in water, dissolution can be achieved using certain methods, e.g. by using surfactants that are water soluble, like the fullerene encapsulation into water-soluble complexes, such as cyclodextrine [3], or by performing chemical functionalization when appropriate hydrophilic groups are covalently attached to them.

A number of fullerene derivatives were reported to interact with proteins; however, a stable and well-defined protein-fullerene complex with a native protein has never been observed. Belgorodsky et al [4] reported the preparation and structural and functional characterization of a complex formed between bovine serum albumin (BSA) and fullerene.

Chen et al. [5] describe assembling glycosylated polymers designed to mimic natural mucins on carbon nanotubes (see FIG. 1). The glycosylated polymer included an aliphatic portion designed to contact to the nanotube and a glycosylated portion, designed to interact with mucin. Carbon nanotubes coated with such "mucin mimics" are described by Chen et al to be soluble in water.

REFERENCES

[1] Hino Y., K. Hirotake, Ohmori Y.; Transient characteristics of polyfluorene-based polymers light-emitting diodes and their application for color tunable devices; Thin Solid Films, 499, 359-363 (2006).
[2] Ajayan et al. *Nature*, 447, 1066 (2007).
[3] C. N. Murthy et al. *Chem. Commun.*, 1194-1195 (2001).
[4] Belgorodsky et al. *ChemBioChem*, 7, 1783 (2006).
[5] Chen, X., Lee, G. S., Zettl, A. & Bertozzi, C. R. Biomimetic synthesis: Biomimetic engineering of carbon nanotubes by using cell surface mucin mimics. Angewandte Chemie, International Edition 43, 6111-6116 (2004).
[6] J. C. Hong, Y. S. Kim, Glycoconjugate journal 2000, 17, 691-703.

SUMMARY OF THE INVENTION

The inventors of the present invention have now developed a methodology enabling the preserving (maintaining) of the original optical profile of an interactable material in a mixture with one or more other interactable materials. Under conditions permitting interaction between such interactable materials, at least one of or each of the interactable materials undergoes a change in their optical profile, namely in at least one optical parameter selected from intensity and frequency and/or full width at half maximum. Under the conditions of the invention, such interaction is minimized or diminished, permitting each of said interactable materials to substantially preserve (maintain) its original optical profile (intensity and/or frequency and/or full width at half maximum).

Thus, in a first aspect of the invention, there is provided a composition of matter comprising an association product of a first material (e.g., an interactable material) with a first shielding agent, said association product (where the material and the shielding agent are chemically associated) having a first optical profile; a second association product of a second material (e.g., an interactable material) with a second shielding agent, said second association product (where the material and the shielding agent are chemically associated) having a second optical profile; and optionally a further material (e.g., an interactable material), said material being optionally associated with a shielding agent to form a further association product (where the material and the shielding agent are chemically associated) having an optical profile being different from the first and second optical profiles; wherein the combination has an optical profile being substantially an accumulation of the optical profiles of each of said association products present in the composition.

In another aspect of the invention, there is provided a composition of matter (for brevity-used interchangeably hereinforth with "combination") of two or more materials, each of said materials being shielded from electronically interacting with at least one other material in the composition, wherein said shielding being afforded (enabled) by at least one shielding agent chemically associated independently with each of said two or more materials, and wherein said shielding preserves at least one of optical and electronic profile of each of said two or more materials.

Without wishing to be bound by theory, and as a person of skill in the art would appreciate, the electronic interaction between two or more of the interactable materials in a composition according to the invention, in the absence of shielding, results in the transfer of a charge carrier (electron, hole, ions, etc) between the two or more interactable materials and/or between one or more of the interactable materials and the medium, e.g., solvent, in which the combination is contained. This transfer of charge carrier between the molecules, results in at least a change in the optical profile, which can be measured, and/or in the electronic profile, namely in a demonstrated alternation in the electronic structure (e.g., electronic density of states). The transfer, in accordance with the invention is arrested by shielding of the interactable materials, as further disclosed herein, by shielding agents. In some embodiments, the electronic interaction is in the form of Förster resonance energy transfer (FRET).

In the absence of shielding, the two or more materials are interactable materials which electronically interact in such a way to exhibit a change in their original optical and/or electronic profile. The interactable materials are capable of interaction as a function of the distance between them, the electronic structure of the materials, and other conditions such as irradiation, temperature, bias, and others. For example, upon interaction between two such materials, their original optical profile may exhibit a change in their optical/electronic spectrum. To substantially arrest such a change, at least one of said two or more interactable materials are shielded from interaction with another of said two or more materials. In some embodiments, each of said two or more interactable materials are shielded. In further embodiments, the extent of shielding is based on the number of interactable materials in the combination, in such a way that the number of interactable materials in the combination exceeds the number of shielding agents by 1. For example, where the combination comprises three interactable materials, at least two of which should be shielded in order to arrest electronic or optical interaction therebetween.

The interactable material is selected amongst hydrophobic materials such as nanostructures. As used herein, the term "nanostructure" refers to a particle or an agglomerate of particles, having at least one outer dimension that is smaller than 1 micrometer. In some embodiments, the nanostructures are organic or inorganic fullerenes, carbon nanotubes, inorganic nanotubes, small molecules, and aggregates thereof, provided that the aggregate has at least one dimension that is smaller than 1 micrometer.

In some embodiments, the interactable material is in the form of a colloid of hydrophobic nanostructures dispersed in water. In other embodiments, the colloids comprise nanostructures having a size of between 1 and 1,000 nanometer dispersed in water.

In some embodiments, the water solution or colloid of the hydrophobic materials further comprises a second shielding agent/solubilizing agent, such as cyclodextrin.

The interactable materials are selected amongst chromophores (dyes) and nanomaterials such as a carbon nanotube (e.g., pristine carbon nanotubes), and a polyaromatic hydrocarbon, and quantum dots.

In some embodiments, the combination comprises two chromophores that emit light in different wavelengths, each of said chromophores being associated with a shielding agent. The chromophores are selected in a non-limiting fashion from fluorescent monomers, fluorescent polymers, metal complexes dopants and dyes, light emitting dopants and fluorescent dyes, phthalocyanines, porphyrines, and others. IN some embodiments, the chromophores are selected from cyanines, indoles, indophenol dyes, porphyrins, corroles, phthalocyanines, polycyclic aromatics, fluorenes, rhodamines, acridines, azin and oxazin dyes, triarylmethane dyes, azo dyes, quinones and conjugated polymers.

In other embodiments, the chromophores are selected amongst polycyclic aromatic dyes such as anthracene, pentacene, pyrene, and coronene.

In other embodiments, the chromophores are selected amongst dyes such as anthracene, pentacene, pyrene, coronene, 3H-Indolium, 2-[5-[1-(5-carboxypentyl)-1,3-dihydro-3,3-dimethyl-5-sulfo-2H-indol-2-ylidene]-1,3-pentadien-1-yl]-1-ethyl-3,3-dimethyl-5-sulfo-, inner salt, potassium salt.

In other embodiments, the chromophores are selected amongst fluorescent monomers such as 2-naphthyl acrylate, 7-[4-(trifluoromethyl)coumarin]acrylamide, 9-anthracenylmethyl methacrylate, ethidium bromide-N,N'-bismethacrylamide, fluorescein o-acrylate, N-(1-naphthyl)-N-phenylmethacrylamide.

In other embodiments, the chromophores are selected amongst fluorescent polymers such as poly((4,4'-hexafluoroisopropylidene)diphthalic anhydride-alt-thionin), poly(2-naphthyl methacrylate, poly(3,3',4,4'-benzophenonetetracarboxylic dianhydride-alt-ethidium bromide), poly(9-anthracenylmethyl acrylate), poly(fluorescein O-acrylate), poly[(4,4'-hexafluoroisopropylidene)diphthalic anhydride-alt-acridine yellow G], poly[(methyl methacrylate)-co-(2-naphthyl acrylate)], poly[N-(1-naphthyl)-N-phenylmethacrylamide].

In other embodiments, the chromophores are selected amongst metal complexes dopants and dyes such as 8-hydroxyquinoline copper(II) salt, bis(2-methyl-8-hydroxyquinolinato)zinc, copper(II) phthalocyanine, lithium tetra (2-methyl-8-hydroxyquinolinato)boron, tris(2,2'-bipyridyl) dichlororuthenium(II) hexahydrate, tris(benzoylacetonato) mono(phenanthroline)europium(III), tris-(8-hydroxyquinoline)aluminum.

In other embodiments, the chromophores are selected amongst light emitting dopants and fluorescent dyes such as 1,1,4,4-tetraphenyl-1,3-butadiene, 1-pyrenebutyric acid, 2-ethylanthraquinone, 3,8-diamino-6-phenylphenanthridine, 5,8-dihydroxy-1,4-naphthoquinone, 5-methoxypsoralen, 9,10-phenanthrenequinone, benzo[k]fluoranthene, phenanthrene, phenazine, pyrene, quinizarin, rubrene, p-terphenyl.

In other embodiments, the chromophores are selected amongst pathalocyanines such as 1,4,8,11,15,18,22,25-octabutoxy-29H,31H-phthalocyanine, 2,9,16,23-tetraphenoxy-29H,31H-phthalocyanine, aluminum 1,4,8,11,15,18,22,25-octabutoxy-29H,31H-phthalocyanine triethylsiloxide, boron sub-2,3-naphthalocyanine chloride, cobalt(II) 2,3-naphthalocyanine, copper(II) 1,4,8,11,15,18,22,25-octabutoxy-29H, 31H-phthalocyanine, disodium phthalocyanine, gallium(III) phthalocyanine hydroxide, indium(III) phthalocyanine chloride, iron(II) phthalocyanine, lead(II) phthalocyanine, manganese(III) phthalocyanine chloride, nickel(II) 2,9,16,23-tetraphenoxy-29H,31H-phthalocyanine, silicon 2,3-naphthalocyanine dichloride, silver phthalocyanine, tetrakis (4-cumylphenoxy)phthalocyanine, tin(II) phthalocyanine, titanyl phthalocyanine, vanadyl 2,3-naphthalocyanine, zinc 2,3,9,10,16,17,23,24-octakis(octyloxy)-29H,31H-phthalocyanine, Zinc(II) tetranitrophthalocyanine.

In other embodiments, the chromophores are selected amongst porphyrines such as 2,3,7,8,12,13,17,18-octaethyl-21H,23H-porphine cobalt(II), 2,3,7,8,12,13,17,18-octaethyl-21H,23H-porphine copper(II), 2,3,7,8,12,13,17,18-Octaethyl-21H,23H-porphine iron(III) acetate, 2,3,7,8,12,13,17, 18-Octaethyl-21H,23H-porphine manganese(III) chloride, 2,3,7,8,12,13,17,18-octaethyl-21H,23H-porphine nickel(II), 2,3,7,8,12,13,17,18-Octaethyl-21H,23H-porphine palladium, 2,3,7,8,12,13,17,18-octaethyl-21H,23H-porphine ruthenium(II) carbonyl, 2,3,7,8,12,13,17,18-octaethyl-21H, 23H-porphine, 5,10,15,20-tetrakis(1-methyl-4-pyridinio) porphyrin tetra(p-toluenesulfonate), 5,10,15,20-tetrakis(4-methoxyphenyl)-21H,23H-porphine cobalt(II), 5,10,15,20-tetrakis(4-sulfonatophenyl)-21H,23H-porphine manganese (III) chloride, 5,10,15,20-tetrakis(pentafluorophenyl)-21H, 23H-porphine palladium(II), 5,10,15,20-tetrakis[4-(allyloxy)phenyl]-21H,23H-porphine, 5,10,15,20-tetraphenyl-21H,23H-porphine ruthenium(II) carbonyl, 5,10,15,20-tetraphenyl-21H,23H-porphine zinc, 5,10,15,20-tetra-p-tolyl-21H,23H-porphine, platinum octaethylporphyrin, protoporphyrin IX zinc(II).

In other embodiments, the interactable material is a nanomaterial selected from a carbon nanotube, a pristine carbon nanotube and a polyaromatic hydrocarbon. In some embodiments, the nanostructure is pristine carbon nanotube. Working with pristine nanotubes may be preferable on working with surface-modified nanotubes, as surface modification tends to decrease electrical conductivity and change mechanical properties of the nanotube.

The shielding of the interactable materials may be achieved by chemically associating thereto at least one material which physically prevents electronic interaction between them, namely minimizes interactability between the materials. Depending on the combination of the invention, its application, the medium in which it is carried, and other parameters, the shielding agents may be selected based on their origin, size, charge, hydrophobicity/hydrophilicity, flexibility, solubility in various solvents, biocompatibility, binding selectivity, stability and other desired physical, chemical and biological properties and degree of expected interactions.

In some embodiments, the shielding agents are selected amongst solubilizing agents capable of rendering each of said interactable materials water soluble. In some embodiments, the solubilizing agent comprises a polypeptide backbone, bound to sugar units. The bonds between the sugar units and the polypeptide backbone are optionally covalent. The term "sugar unit" is used herein to refer to moieties containing one monosaccharides and/or oligosaccharides. In some embodiments, some or all of the sugar units are sugar derivatives, for example amino sugars, sulfo sugars, or carbasugars.

Examples of sugars include aldopentoses, e.g., ribose; aldohexoses, e.g., glucose; ketopentoses, e.g., ribulose; ketohexoses, e.g., fructose; amino sugars, e.g., galactosamine, glucosamine, sialic acid, or N-acetylglucosamine; and sulfosugars, e.g., sulfoquinovose, and compounds comprising two or more of the above exemplified sugar units covalently bound to each other, e.g., by glycosidic bonds.

In some embodiments, the chromophore is one or more of anthracene, (referred to herein as ant), tris(benzoylacetonato)mono(phenanthroline)europium(III) (referred to herein as the Eu complex), and tris-(8-hydroxyquinoline)aluminum (referred to herein as the Al complex or ALQ3)).

In further embodiments, the combination of the invention comprises anthracene, tris(benzoylacetonato)mono(phenanthroline)europium(III) and tris-(8-hydroxy quinoline)aluminum. In some embodiments, each of the aforementioned chromophores is associated with a shielding agent. For example, in a composition of the invention, a first association product is of anthracene and a shielding agent, said second association product is of tris(benzoylacetonato)mono(phenanthroline)europium(III) and a shielding agent, and wherein said further association product is of tris-(8-hydroxyquinoline)aluminum and a shielding agent. In some embodiments, and as further disclosed hereinbelow, said shielding agent is mucin.

In some embodiments, the solubilizing agent comprises a sugar-substituted polypeptide. In other embodiments, the solubilizing agent is a glycoprotein or a proteoglycan.

In some embodiments, the at least one solubilizing agent is a glycoprotein, i.e., a sugar-substituted polypeptide; the polypeptide containing oligosaccharide substituents. In some embodiments, the saccharide moieties constitute between 50 and 90% wt of the sugar-substituted polypeptide. In other embodiments, the saccharide moieties constitute between 50 and 80% wt of the sugar-substituted polypeptide. In further embodiments, the saccharide moieties constitute between 60 and 90% wt of the sugar-substituted polypeptide and in still other embodiments, the saccharide moieties constitute between 60 and 80% wt of the sugar-substituted polypeptide. The number of sugar units per oligosaccharide substituent is, in some embodiments, between 3 and 30. In other words, the number of sugar units per oligosaccharide substituent is 3, 4, 5, 6, 7, 8, 9, 10, 11, 12, 13, 14, 15, 16, 17, 18, 19, 20, 21, 22, 23, 24, 25, 26, 27, 28, 29 or 30.

In some embodiments, the shielding agent/solubilizing agent is a glycoprotein selected to have at least 25% and at most 75% (w/w) oligosaccharide groups.

In some embodiments, the sugar-substituted polypeptide contains oligosaccharide substituents, and has a branching degree of between 0.086 and 0.45 when computed, as described below.

In some embodiments, the at least one glycoprotein is mucin (native mucin) or transferrin. In further embodiments, the at least one glycoprotein is mucin (native). In some embodiments, the mucin is not mucin mimic.

The combination of the invention is a mixture of the two or more interactable material complexes, as disclosed herein. The complexes may be in equal molar ratio, or equal weight ratio, or equal percent ratio, or may be present in the combination at any other ratio. Where the combination is of two complexes, the ratio between the complexes is between 0.05:1 to 1:0.05. Where the combination is of three or more complexes, the ratio of two of said complexes is between 0.05:1 to 1:0.05. In some embodiments, the ratio between the two complexes is 1:1.

The mixture may be a solid mixture, a solution (aqueous or non-aqueous) or a film on a substrate. In some embodiments, the mixture is in the form of a film on a substrate. In other embodiments, the film is a thin film of the combination not associated with a substrate (stand alone film).

In further embodiments, the mixture is in the form of a solution in a solvent; the solvent being aqueous or non-aqueous (organic). In some embodiments, the solvent is water or a water-containing liquid mixture. The combination of the invention may be present in the solution at any concentration. In some embodiments, the solvent makes at least 70% weight of the mixture.

In some embodiments, the solubilizing agent increases the water solubility of the interactable material, e.g., nanostructure, by at least 2 orders of magnitude. In other embodiments, the increase in water solubility is by 2, 3, 4, 5, 6, 7 or 8 orders of magnitude, and in some other embodiments, by 9, 10 or 11 orders of magnitude. Within the context of the present invention, solubility of a material in a solvent is defined as the maximal amount of the material that can be introduced into the solvent without increasing the average size of the material particles to above 1 micrometer.

In some embodiments, the solution further comprises a pH adjusting agent, for example, a buffer. In embodiments where the solubilizing agent is a naturally occurring biological entity, for example, mucin or transferrin, the pH of the solution may be adjusted to a pH under which the solubilizing agent is active in nature. For example, the pH of solutions where the solubilizing agent is a mucin taken from the stomach of an animal is optionally adjusted to be in the range existing in the stomach, for example, between 2 and 5, while the pH of solutions where the solubilizing agent is a transferring taken from blood of an animal, the pH is the pH of the blood, for example, between 6 and 8.

In some embodiments, the combination comprises a first interactable material associated with a first shielding agent, e.g., a solubilizing agent, said association product of the first interactable material and first shielding agent (herein referred to as a complex) having a first optical profile (frequency and intensity); a second interactable material associated with a second shielding agent, e.g., a solubilizing agent, said association product of the second interactable material and second shielding agent (complex) having a second optical profile; and optionally a further interactable material, said material being optionally associated with a shielding agent, e.g., a solubilizing agent, said association product of the further interactable material and a shielding agent (complex) having an optical profile being different from the first and second optical profiles;

wherein the combination having an optical profile being substantially an accumulation of the optical profile of each of said complexes present in the combination.

In some embodiments, the combination, e.g., aqueous mixture, comprises three interactable materials, two of which being associated (complexed) with shielding agents (same or different), e.g., mucin. The third interactable material need not be complexed with a shielding agent. However, in some embodiments, the third interactable material is complexed as well with a shielding agent (same or different).

In some embodiments, the shielding agents, e.g., solubilizing agents are the same.

In some embodiments, the combination is a mixture comprising a solvent, e.g., water, and wherein each of the solubilizing agents is mucin.

Thus, there is provided an aqueous mixture of at least one interactable material, each of said materials being associated with mucin, wherein each of said materials having an original optical profile which is substantially preserved in the mixture.

In some embodiments, the at least one interactable material is a nanostructure; the nanostructure being selected, in some embodiments, from a nanotube, a fullerene, and a polyaromatic hydrocarbon.

In some embodiments, the mixture is a clear water solution. In other embodiments, the mixture is a water emulsion.

The amount of solvent necessary to dissolve or make stable the complexes, e.g., interactable material-shielding material, may vary depending on the amount of each of the complexs, the solvent employed and other relevant parameters. Typically, the amount of solvent is selected to afford a stable solution or emulsion. In some embodiments, the solvent constitutes between 40 and 90% of the mixture (solution/emulsion). In other embodiments, the solvent constitutes between 50 and 80% of the mixture. In further embodiments, the solvent constitutes between 50 and 70% of the mixture. In other embodiments, the solvent constitutes between 60 and 90% of the mixture. In still other embodiments, the solvent constitutes between 70 and 90% of the mixture. In further embodiments, the solvent constitutes at least 70% of the mixture.

As stated hereinabove the shielding of the interactable materials in the combinations of the invention preserves (maintains) the original optical profile of each of the interactable material in the mixture. The original profile of each material in the absence of a shielding agent changes (intensity and/or frequency and/or full width at half maximum) as a function of the degree of electronic interaction between the materials. Thus, the shielding of the interactable materials substantially preserves the original optical profiles, or in other words the interaction is minimized or diminished. In some embodiments, the electronic interaction is reduced by shielding by a factor of at least 10 in comparison to the effect shown for the same interactable materials in a mixture free of the shielding/solubilizing agents. In some embodiments, the original optical profiles are preserved. In other embodiments, at least one optical parameter (intensity, frequency) changes (reduced intensity or shift of frequency) by no more than 10% of the original value.

Depending on the optical profile of the interactable materials and their relative concentrations/amounts in the combination/mixture, as defined herein, the light emitted by the combination may be white or of any color. As demonstrated hereinbelow, generally, white light emission can be formed by mixing the various interactable materials, e.g., a red chromophore, a green chromophore and a blue chromophore in the appropriate ratio (amount) giving rise to the white light emission. Alternatively, white emission may be obtained by employing a 2-color process in which, e.g., a blue emitting chromophore excites a yellow emitting material (e.g., Phosphor in standard LEDs). The artificial yellow color is created by mixing red and green chromophores in the at least one shielding agent, e.g., mucin, in a post-mix solution. Subsequently, a white color is produced through an optical calibration of the blue and the yellow. Due to fact that by employing the method of the invention a broad spectrum of colors may be easily achievable, both of the above approaches may be utilized for the formation of a white color.

The invention further provides a device comprising a film of a combination according to the invention. The device, depending on its nature and intended application may further comprise an electrode assembly (a cathode and an anode). The device may be in the form of a monolayered or multilayered structure.

In some embodiments, the device is selected from a sensor, a humidity sensor, a light emitting diode, a solar cell, a photovoltaic cell, a light transducer, and a tag. In further embodiments, the device is a multicolored organic light emitting diode (OLED). The OLED of the invention comprises a film of a combination according to the invention (a solid film), the combination being a light emitting and/or carrier-transporting medium. The OLED may be a mono- or a multilayered OLED having, in some embodiments, a sandwich-like structure which includes a cathode (of a metal or a metal alloy, the metal being selected from aluminum, magnesium, titanium, gold and silver); a film of a combination of the invention as an emitting layer(s); and an anode, made in some embodiments of indium-tin oxide (ITO) or another conducting inorganic oxide. The anode is in some embodiments covered or encapsulated with a protecting layer of glass or insulating plastic.

One or both of said anode and cathode may be transparent.

In some embodiments, the combination employed in an OLED according to the invention, comprises three interactable materials, each being coated with mucin; one of said materials emitting in the red region of the electromagnetic spectrum, the second material emitting in the green region of the electromagnetic spectrum and the third emitting in the blue region of the electromagnetic spectrum.

In some embodiments, the three interactable materials are present in a ratio of 1:1:1, provided that the three interactable materials have the same intensity, thereby yielding in an OLED according to the invention a white OLED. In other embodiments, the ratio may be different from 1:1:1, depending inter alia on the relative intensities and other parameters, to yield an OLED of a color different than white.

In a further aspect of the invention, there is provided a film comprising a sugar-substituted polypeptide in complex with a nanostructure.

In some embodiments, the film has a thickness of between 2 microns and 50 microns. In other embodiments, the sugar-substituted polypeptide contains oligosaccharide substituents, and the number of sugar units per oligosaccharide substituent is between 3 and 20. In other embodiments, the sugar-substituted polypeptide contains oligosaccharide substituents, and has a branching degree of between 0.086 and 0.45.

In some films according to the invention, the solubilizing agent comprises or is mucin and/or transferrin.

In another aspect of the invention there is provided a solid film comprising a composition (combination) according to the invention. In some embodiments, the film comprising a composition of a material emitting in the red region of the electromagnetic spectrum, a material emitting in the green region of the electromagnetic spectrum and a material emitting in the blue region of the electromagnetic spectrum, each of said materials being chemically associated with mucin.

There is further provided by the present invention, a method of preparing a combination/mixture according to the invention, the method comprising obtaining a water solution of at least one shielding agent, e.g., a solubilizing agent; and adding thereto at least one interactable material to obtain a combination/mixture.

There is further provided a method of preparing a film of a combination of the invention, the method comprising applying a combination of the invention in a solvent, as described above on at least a portion of a surface of a substrate; and drying the solvent of the applied solution to thereby obtain a film on said at least a portion of the surface.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 1 is a schematic illustration of a nanotube bound to a "mucin mimic" according to Chen et al [1].

FIG. 2A—$C_{60}$; FIG. 2B—$WS_2$ nanostructures; and FIG. 2C—carbon nanotubes. In each of the Figures, the right hand vial contains also a shielding agent and the left-hand vial is free of a shielding agent.

FIG. 3A—BSM in sodium phosphate buffer; FIG. 3B—$C_{60}$-fullerene in $CHCl_3$ (line a) and $C_{60}$-BSM complex in sodium phosphate buffer (line b); FIG. 3C—IF-$WS_2$-BSM complex in sodium phosphate buffer; and FIG. 3D—MWNT-BSM complex in sodium phosphate buffer.

FIG. 4A—SEC of BSM; FIG. 4B—DLS of BSM; FIG. 4C—SEC of $C_{60}$-BSM complex; FIG. 4D—DLS of $C_{60}$-BSM complex; FIG. 4E—SEC of IF-$WS_2$-BSM complex; FIG. 4F—DLS of IF-$WS_2$-BSM complex; FIG. 4G—SEC of MWNT-BSM complex; and FIG. 4H—DLS of MWNT-BSM complex.

FIGS. 5A-J are STEM and AFM images of BSM and BSM-ligand complexes: FIG. 5A—STEM image of native BSM deposited on holey carbon-formvar support; FIG. 5B—AFM image of native BSM deposited on mica; FIG. 5C—STEM image of $C_{60}$-BSM complex deposited on holey carbon-formvar support with magnification of ×17,345; FIG. 5D—AFM image of the $C_{60}$-BSM complex deposited on mica; FIG. 5E—Magnification of large IF-$WS_2$ cluster from FIG. 5F, (magnification of ×600,000); FIG. 5F—STEM image of the IF-$WS_2$-BSM complex deposited on the holey carbon-formvar support and collected by Everhart Thornley Detector (ETD) (magnification of ×40,000); FIG. 5G—Magnification of large IF-$WS_2$ cluster from FIG. 5F, (magnification of ×300,000); FIG. 5H-STEM images of the MWNT-BSM complex deposited on the holey carbon-formvar support, (ETD mode, magnification of ×40,000); FIG. 5I—STEM images of the MWNT-BSM complex deposited on the holey carbon-formvar support, (magnification of ×90,000); FIG. 5J—The same view as in FIG. 5I, collected in ETD mode; and FIG. 5K—TEM of MWNT.

FIGS. 6A-D are UV-Vis spectra of BSM, ligands and complexes: FIG. 6A—BSM in sodium phosphate buffer; FIG. 6B—Ant in $CHCl_3$ (line a) and Ant-BSM complex in sodium phosphate buffer (line b); FIG. 6C—Bap in $CHCl_3$ (line a) and Bap-BSM complex in sodium phosphate buffer (line b); and FIG. 6D—Cor in $CHCl_3$ (line a) and Cor-BSM complex in sodium phosphate buffer (line b).

FIGS. 7A-K are two- and three-dimensional fluorescence spectra of BSM, ligands and complexes: FIG. 7A—3D spectrum of BSM in sodium phosphate buffer; FIG. 7B—2D spectrum of BSM in sodium phosphate buffer; FIG. 7C—3D spectrum of Ant in $CHCl_3$; FIG. 7D—3D spectrum of Ant-BSM complex in sodium phosphate buffer; FIG. 7E—2D spectra of Ant in $CHCl_3$ (line a) and Ant-BSM complex in sodium phosphate buffer (line b); FIG. 7F—3D spectrum of Bap in $CHCl_3$; FIG. 7G—3D spectrum of Bap-BSM complex in sodium phosphate buffer; FIG. 7H—2D spectra of Bap in $CHCl_3$ (line a) and Bap-BSM complex in sodium phosphate buffer (line b); FIG. 7I—3D spectrum of Cor in $CHCl_3$; FIG. 7J—3D spectrum of Cor-BSM complex in sodium phosphate buffer; and FIG. 7K—2D spectra of Cor in $CHCl_3$ (line a) and Cor-BSM complex in sodium phosphate buffer (line b).

FIGS. 8A-H are size-exclusion chromatograms and dynamic light scattering analyses of BSM and BSM-ligand complexes: FIG. 8A—SEC of BSM; FIG. 8B—DLS of BSM; FIG. 8C—SEC of Ant-BSM complex; FIG. 8D—DLS of Ant-BSM complex; FIG. 8E—SEC of Bap-BSM complex; FIG. 8F—DLS of Bap-BSM complex; FIG. 8G—SEC of Cor-BSM complex; and FIG. 8H—DLS of Cor-BSM complex.

FIGS. 9A-C are STEM images of BSM and BSM-ligand complexes: FIG. 9A—STEM image of native BSM deposited on holey carbon-formvar support; FIG. 9B—STEM images of BSM-Cor complex deposited on holey carbon-formvar support (magnification of ×40,000); and FIG. 9C—STEM image of BSM-Cor complex deposited on holey carbon-formvar support (magnification of ×190,000).

FIGS. 10A-D are chromatograms of BSM-PAHs at 345 nm (FIG. 10A), and UV-vis spectra of the three peaks shown therein: FIG. 10B of the peak at 11.9 min; FIG. 10C of the peak at 22.8 min; and FIG. 10D of the peak at 24.3 min.

FIG. 11 shows the emission spectra of three dyes (Ant, Eu complex, and Al complex) in DSMO.

FIGS. 12A-C show the emission spectra of Ant, Eu complex, and Al complex, respectively, each complexed with BSM in aqueous solution.

FIG. 13 is an emission spectrum of a dye mixture, in DMSO showing FRET effect (compare to FIG. 11).

FIG. 14 is an emission spectrum of a mixture of dye-solubilizing agent complexes, in an aqueous solution, with practically no FRET effect.

FIG. 15 is a spectrum of a mixture of dyes with a solubilizing agent, in an aqueous solution.

FIG. 16 shows transmission spectra of SWNT-BSM films on quartz substrate in different SWNT concentrations.

FIG. 17 shows transmission spectra of films made of mucing-nanostructure films. The nanostructures are single wall carbon nanotubes, multi wall carbon nanotubes, and $C_{60}$.

Figure 18:
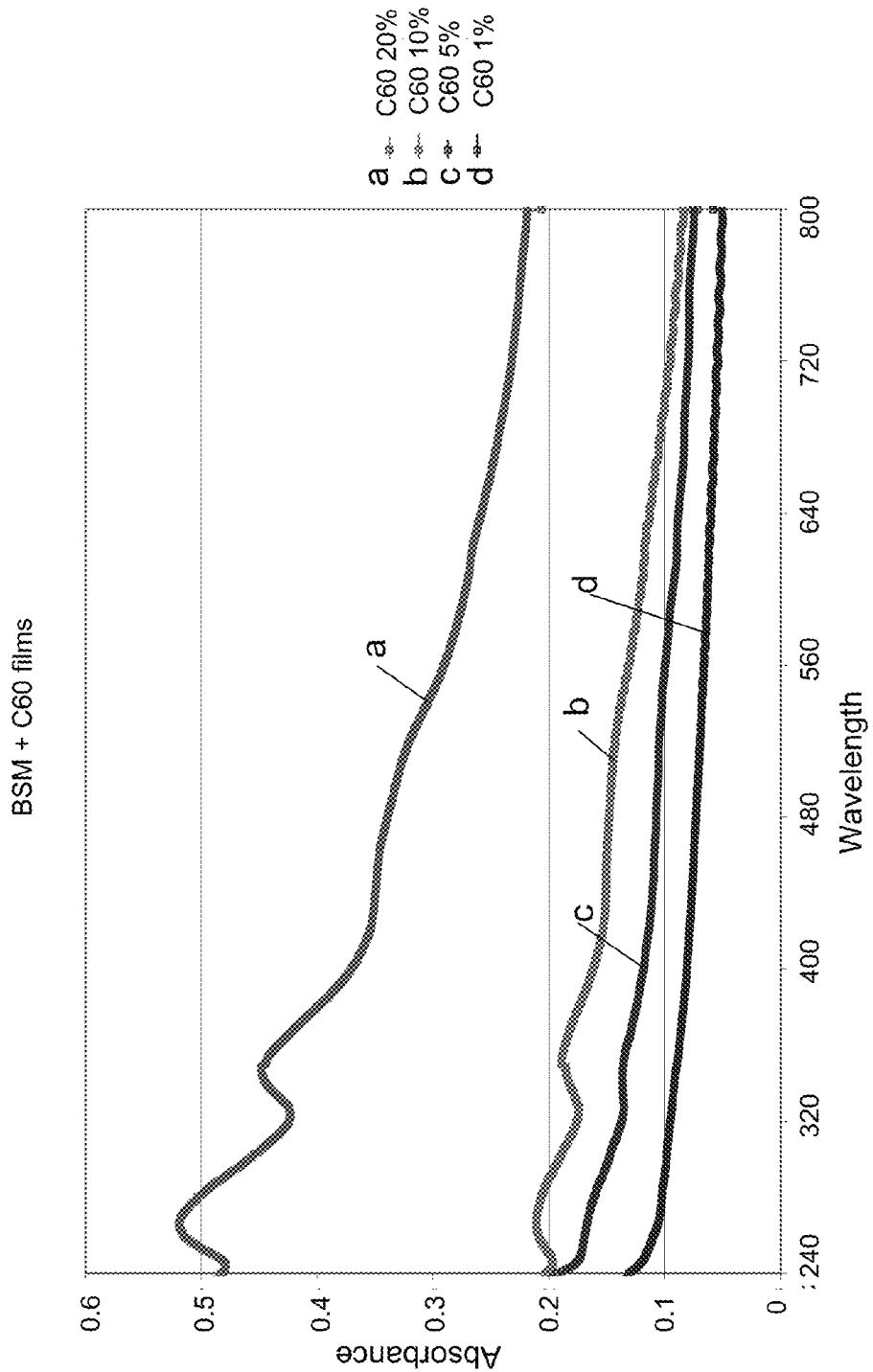

FIG. 18 shows UV-Vis spectra of four stand alone films of $C_{60}$-mucin complexes.

Figure 19:
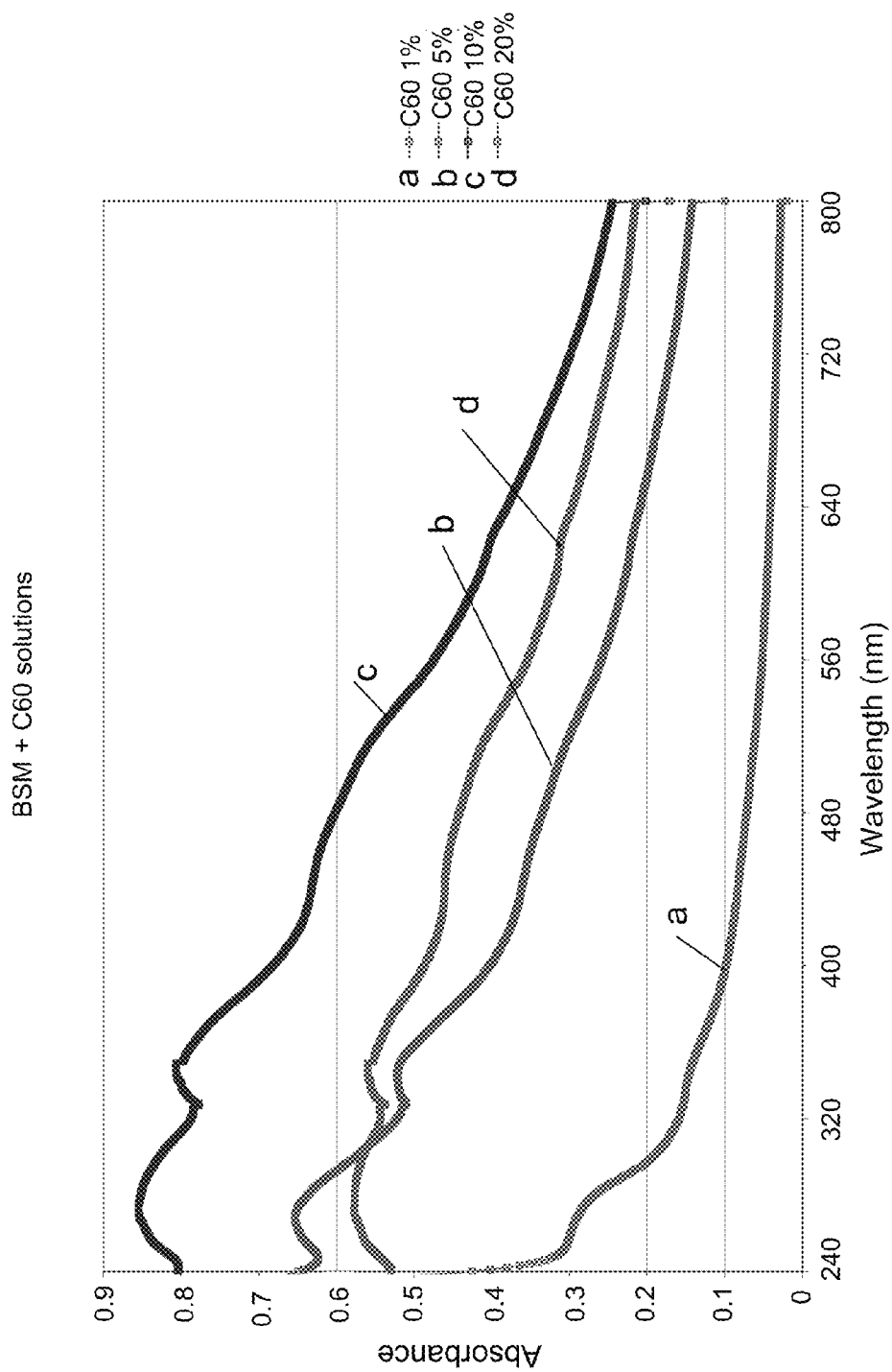

FIG. 19 shows UV-Vis spectra of four mixtures of $C_{60}$-mucin complexes.

DETAILED DESCRIPTION OF EMBODIMENTS

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

Exemplary Solubilizing Agents

In some exemplary embodiments, the backbone is bound to oligosaccharides. Optionally, at least some of the oligosaccharides are branched. Alternatively or additionally, the number of sugar units per oligosaccharide is from about 5 to about 15.

In some exemplary embodiments, the branching degree (BD) of the sugar substituted polypeptide is between about 0.086 and 0.45, when calculated using the Equation 1:

$$B_D = \frac{(1\sum n_1) + (2\sum n_2) + (3\sum n_3) \ldots}{T+L} \qquad \text{Eq. 1}$$

In Equation 1, $B_D$ is the degree of branching, T is the total number of monomer units, L is the number of units in the longest, least-branched, continuous chain containing the reducing end, $n_1$ is the number of units in all primary antennae, $n_2$ is the number of units in a secondary antennae, which are chains connected to primary antenna, and $n_3$ is the number of units in chains connected to secondary antennae, etc.

The formula of Eq. 1 was devised to assign a degree of branching (BD) to an oligosaccharide based on the longest continuous linear chain containing the reducing end (L) and various weights to side chains. Side chains are categorized depending on whether they are attached to the main linear unit or to some other side chains. A side chain has a higher value the further it is from the main chain. The size of the side chain is also important and is given by the number of saccharide monomers on the particular side chain ($n_j$); the larger is the size of the larger is its contribution to the degree of branching. Also, the more remote a side chain is from the longest continuous linear chain, the larger its contribution to the branching degree.

The size of the compound is considered to allow comparisons between oligosaccharides containing different numbers of monomer.

Exemplary Mixtures

In some embodiments, the mixture comprises nanostructures, having a single-peak size distribution. Some such embodiments show a spectroscopic peak characteristic of a single nanostructure.

In some embodiments, the mixture shows more than one peak, attributable to two or more aggregates of a basic nanostructure. For example, one peak In some embodiments, the mixture is clear. Optionally, a mixture is referred to as clear if its light absorption does not change in more than 10% after filtering with a filter of specified pore size. In some embodiments, the pore size is about 0.2 micrometers. In other embodiments, the pore size is about 0.45 micrometer.

The weight ratio between the nanostructure and the solubilizing agent is optionally between about 1 and about 20 weight percent of nanostructures in solubilizing agent.

Alternatively or additionally, the concentration of the mixture is between about 0.1 g/l and 2 g/l nanostructures in solution.

Exemplary Dye Mixtures

In an exemplary embodiment, the mixture is of two or more luminescent dyes. The luminescent dyes are optionally selected from photo-luminescent and electro-luminescent dyes. Optionally, the dyes are fluorescent dyes.

It is generally known that in a solution containing a mixture of luminescent dyes, energy is transferred from one dye to another, such that only one of the dyes emit light to the environment. Usually, the dye that emits light is that of the lowest energy, which emits light of longest wavelength. This phenomenon is sometimes referred to as FRET effect. It has been surprisingly found that when the solution comprises a solubilizing agent as described above, energy transfer between the dyes is substantially reduced, and light is emitted from each dye quasi-independently. This way, light emitting solutions of various colors may be obtained by mixing appropriate concentrations of light emitting dyes stabilized by a solubilizing agent as described above.

In one example, a light is emitted from a mixture of red, blue, and green mucin-stabilized luminescent dyes to provide a solution that emits white light.

Exemplary Films

An aspect of some embodiments concerns a film of nanostructures stabilized with a solubilizing agent. The film is optionally coating a substrate, optionally, an outer surface of a substrate. Some examples of substrates that were found suitable include: quartz, Teflon, and mica.

In some embodiments, the obtained film is a stand alone film, in the sense it can be pilled off the substrate without breaking or dissociating.

In some embodiments, the thickness of a coating film is from about 2 microns to about 50 microns, preferably between about 2 and about 5 microns.

In some embodiments, a stand alone film has thickness of from about 0.25 mm to about 2 mm.

An aspect of some embodiments concerns a method of making a film of hydrophobic nanostructures. In an exemplary embodiment, a film is obtained by providing, on a substrate surface, a mixture in accordance with an embodiment described above, and drying the mixture. Optionally, providing the mixture on the substrate comprises placing a droplet of the mixture on the substrate. Optionally, providing also comprises smearing the droplet on the surface. Alternatively or additionally, placing a droplet comprises applying spin-coating, dip coating, and/or other techniques known in the art of coating.

Optionally, drying comprises exposing to ambient air, for example, in a fume hood, for several hours to several days, for example, overnight. In some embodiments, making a stand alone film comprises separating the obtained film from the substrate, for instance, by peeling, to obtain an independent stand alone layer.

In some embodiments, a dried solution of three mucin-stabilized dyes provides a light emitting film. Optionally, the film emits light in response to being electrified, forming a white LED.

Experimental Results

Reference is now made to the following experimental results, which together with the above descriptions illustrate some embodiments of the invention in a non-limiting fashion.

The applicants demonstrated that a representative mucin glycoprotein, Bovine Submaxillary Mucin (BSM), is capable of binding to and inducing solubilization of water-insoluble materials in water or aqueous solutions, e.g., physiological solutions. The amounts of water-insoluble materials solubilized by the mucin were considerable, as further detailed below.

Fullerene, Carbon Nanotubes, and Inorganic Nanostructures

Preparation of Mucin-Nanostructure Complex

A procedure of preparing a BSM complex with a nanostructure ligand included incubating the BSM protein in phosphate buffer solution (at physiological pH) with the selected nanostructure ligand, optionally in its solid state. Alternatively or additionally, the nanostructure ligand was introduced to the solution dissolved in a hydrophobic solvent. After an incubation period, the mucin-ligand complex formed following the incubation of the BSM and nanostructure ligand, as described, was separated by filtering through a 0.45 μm filter, followed by an open column gel-permeation chromatography (Sephadex G-25).

Figures 2A, 2B, 2C:
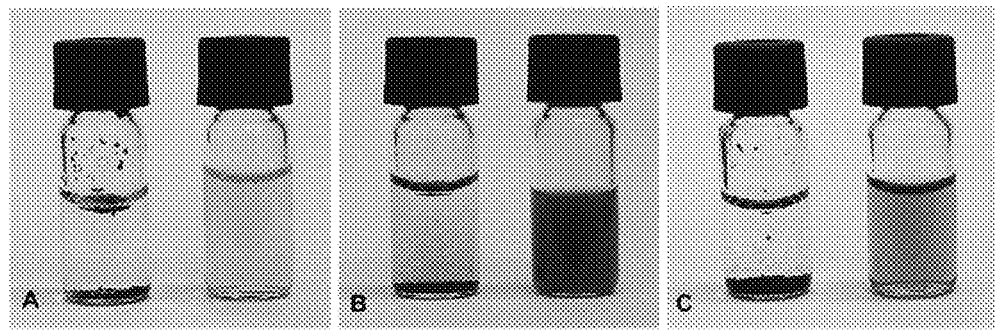
FIGS. 2A-C present a series of vials containing each a water solution of a hydrophobic nanostructure.

As shown in FIG. 2, the resulting mucin-ligand complexes appeared to be fully soluble in the sodium phosphate buffer solution. The solution was free of cloudiness or turbidity.

Complexes of mucin with nanostructures were prepared following the above procedure with a variety of ligand molecules, such as: $C_{60}$, inorganic fullerenes (IF) such as $WS_2$, or multi-walled carbon nanotubes (MWNT).

UV-VIS Spectra of the Prepared Complexes

Figure 3A:
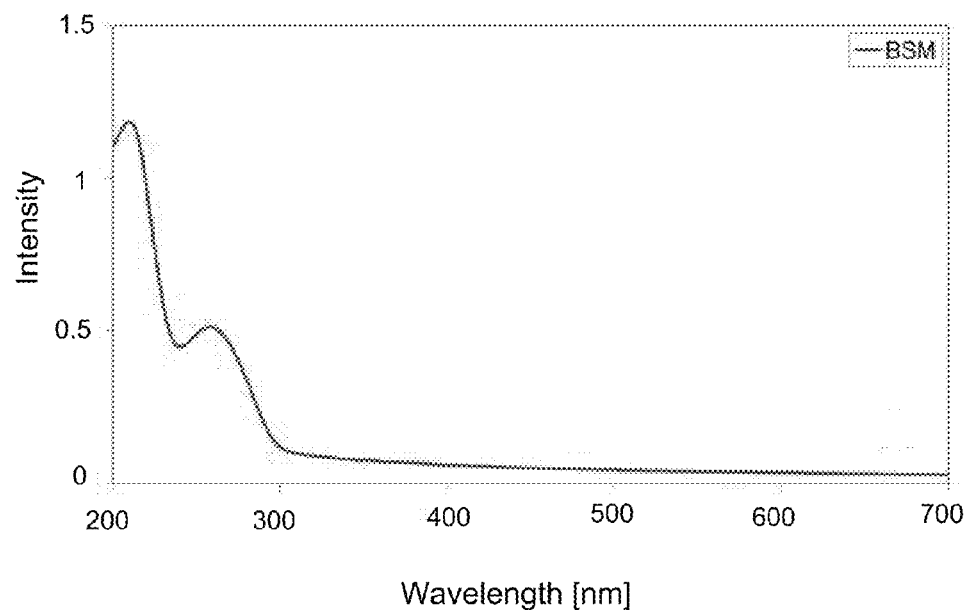
FIGS. 3A-D show the absorption UV-Vis spectra of various species as follows.
Figure 3B:
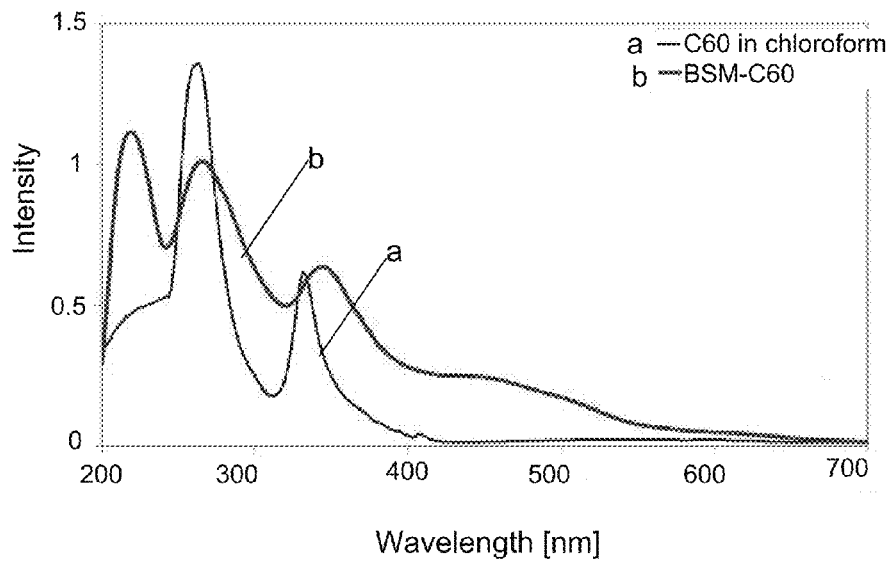
Figure 3C:
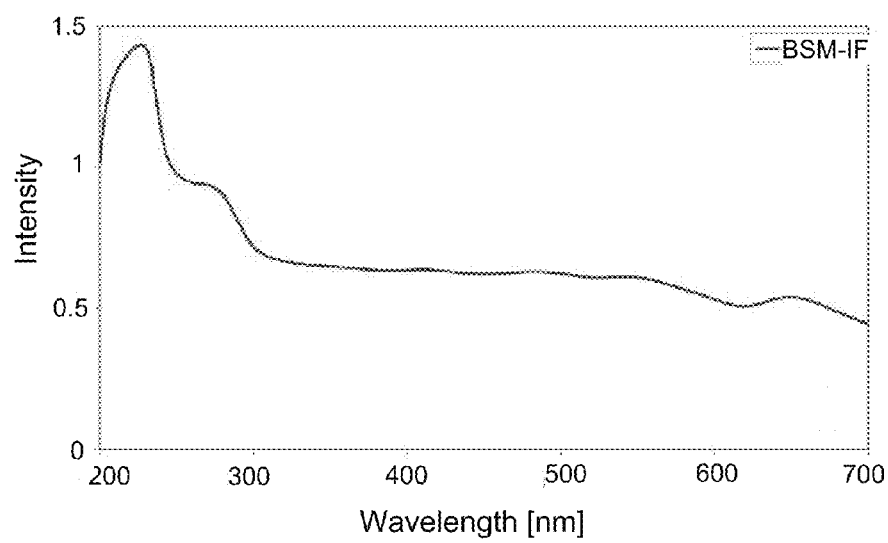
Figure 3D:
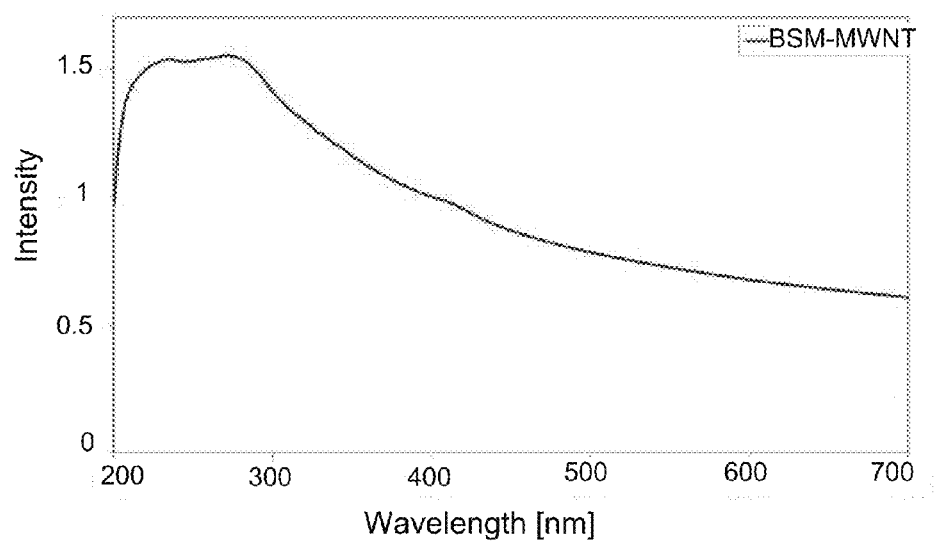

UV-vis spectra were measured for each of the mucin-ligand complexes and are shown in FIGS. 3A-3D. The spectra reveal that the mucin permits the solubilization of the various ligands in the aqueous solution. The spectrum of mucin-$C_{60}$ complex was characterized by broad absorbance bands in the 400-650 nm region, these bands being typical to $C_{60}$ clusters (FIG. 3B). The UV-vis spectrum of the mucin-MWNT complex (FIG. 3D) closely resembled spectral data reported for the MWNT dispersion in aqueous solutions.

Complex Size Evaluation

Further characterization and evaluation of the overall sizes of the mucin complexes were performed using dynamic light scattering (DLS) and size-exclusion liquid chromatography (SEC).

Native Mucin

Figure 4A:
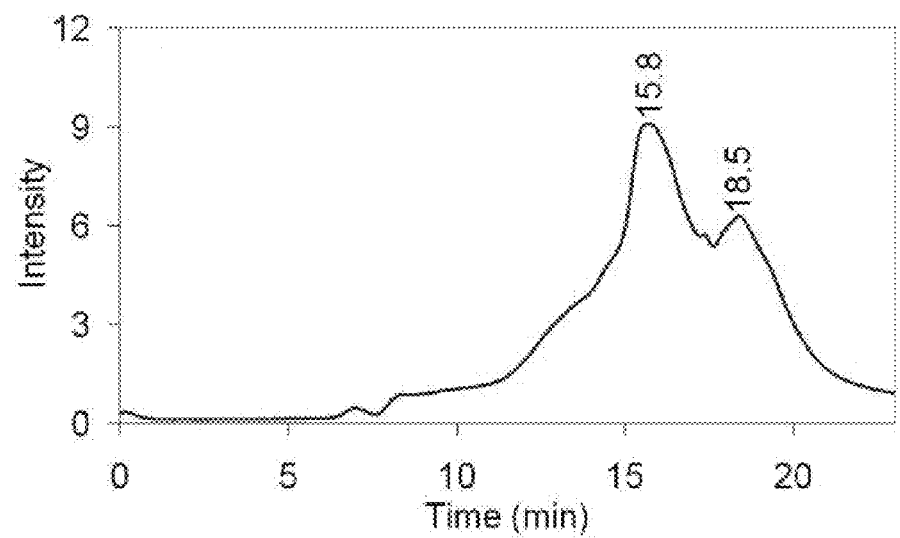
FIGS. 4A-H shows size-exclusion chromatograms (SECs) and dynamic light scattering (DLS) analyses of BSM and BSM-ligand complexes.
Figure 4B:
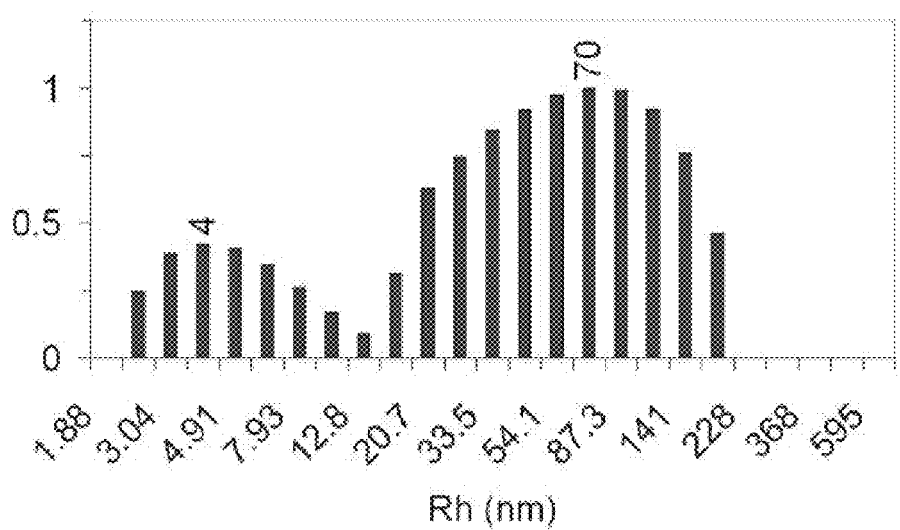

In a phosphate buffer solution (20 mM, pH 7.2) the native BSM glycoprotein (2 mg mL-1) was present in two populations, as evidenced from the SEC chromatogram of the BSM (monitored at 280 nm, FIG. 4A) which comprised two partially overlapping peaks: one at 18.5 min (entities with smaller sizes) and the other at 15.8 min (entities with larger sizes). DLS measurements of the same material (FIG. 4B) indicated that the first population was comprised of species with a median hydrodynamic radius (Rh) of 4 nm, a size that corresponds to the monomeric unit of the BSM protein, with reported molecular weight of 170 KDa. The second population was comprised of larger species with a broader range of sizes (Rh of 70 nm), indicating the presence of BSM in the form of oligomers.

Mucin-Fullerene Complex

Figure 4C:
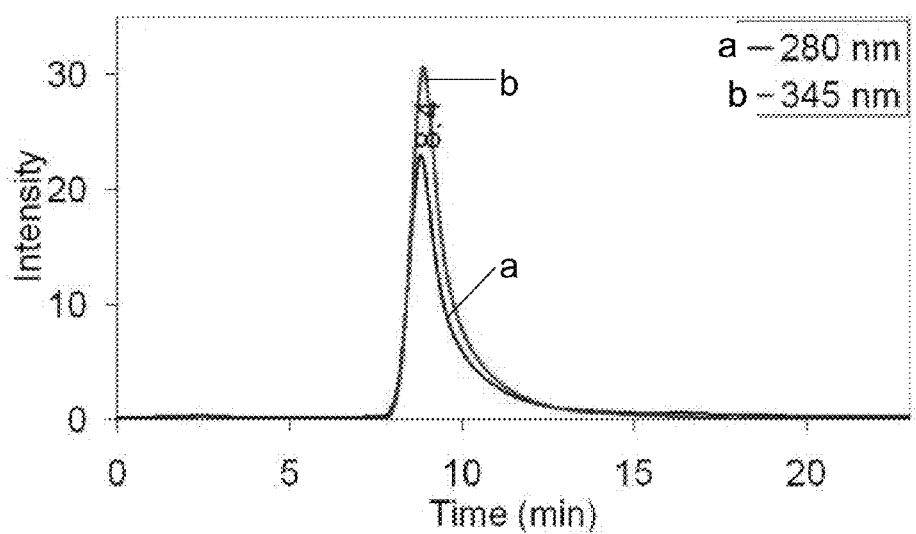
Figure 4D:
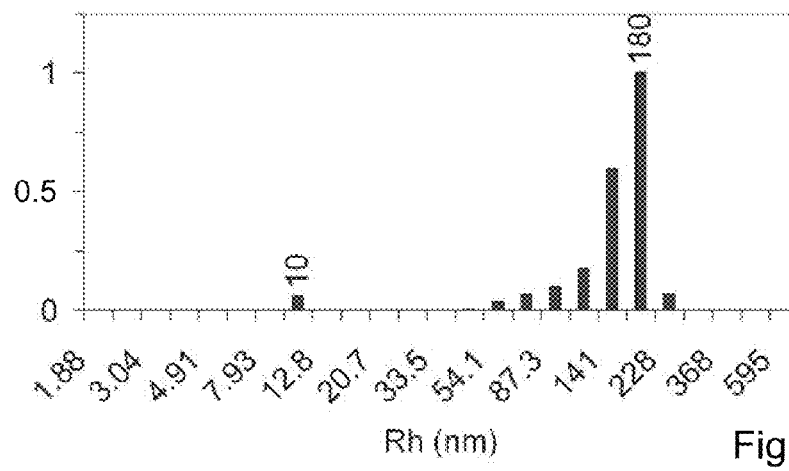

SEC analyses of mucin-$C_{60}$ complex showed practically complete transformation of the starting BSM protein into larger, ligand-loaded entities (eluting at the retention time (RT) of 8.4 min, FIG. 4C). The DLS analysis of the mucin-$C_{60}$ complexation product also showed a presence of one major population with Rh values of 180 nm (FIG. 4D).

The presence of BSM oligomers, combined with the UV spectra indicating the presence of fullerenes in clusters, suggests that the large clusters are not necessarily bound inside hydrophobic cavities formed by the BSM protein, and that at least some of clusters potentially bind to several BSM monomers or oligomers.

As may also be noted, in the samples studied, practically all the BSM protein assisted in the dissolution of the fullerenes.

Mucin-IF-$WS_2$ Complex

Figure 4E:
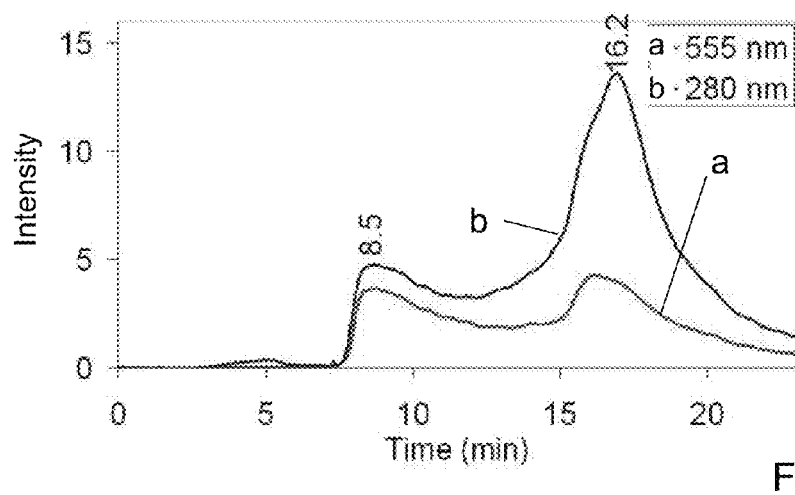

In contrast to that of $C_{60}$-fullerene, the SEC analysis of the mucin-IF-$WS_2$ complexation showed formation of two products (FIG. 4E). The chromatogram, measured at 280 nm, showed that although the major species eluted at the same time as the BSM protein (peak at 16.2 min), a certain population eluted at a retention time of 8.5 min. The chromatogram measured at 550 nm (a wavelength at which only the inorganic material is observed) revealed that the $WS_2$ ligand was present in both products. The host-to-ligand ratio in species eluted at 8.4 min was substantially higher than in species eluting at 16.2 min.

Figure 4F:
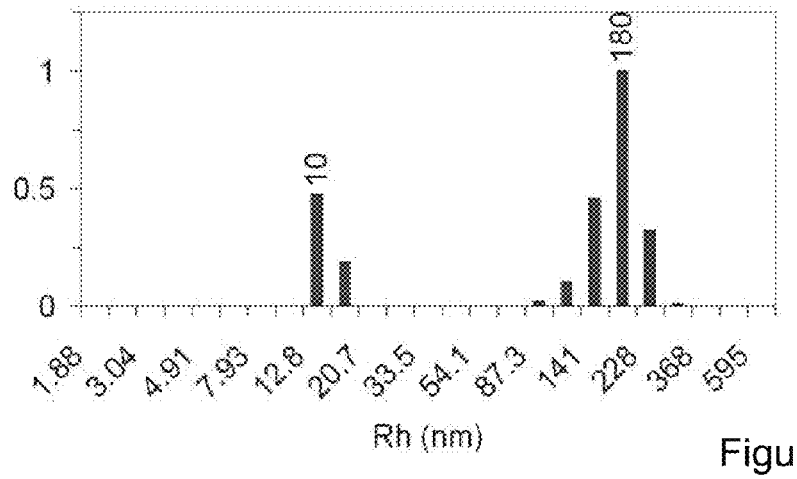

The DLS analysis also showed the presence of two populations of species (FIG. 4F). The species with Rh of 10 nm was attributed to BSM dimers and the larger species, with Rh of 180 nm, potentially corresponds to nanoparticles comprised of a hydrophobic IF-$WS_2$ cluster core coated by several BSM oligomers.

Figure 4G:
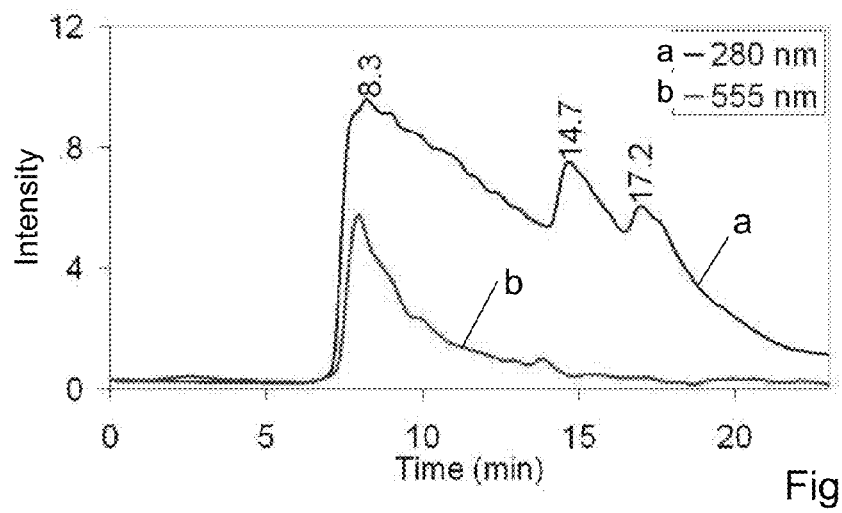

Without wishing to be bound by theory, it should be noted that it was expected that, as in the case of $C_{60}$, MWNT would form relatively large aggregates, binding all available BSM protein. However, results of both DLS and SEC analyses demonstrated that only a fraction of the available BSM protein participated in complexation. The SEC chromatogram, monitored at 280 nm, showed that although a considerable fraction of the species eluted at times equivalent to those observed for BSM protein alone (peaks at 14.7 and 17.2 min), a significant portion of the material eluted at a retention time of 8.4 min (FIG. 4G).

Figure 4H:
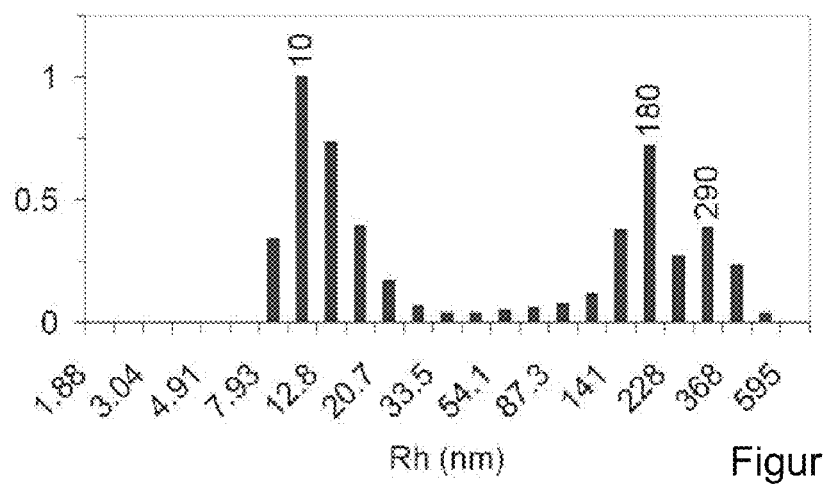

The SEC chromatogram monitored at 550 nm, at which only the MWNT was observed, revealed that the majority of the MWNT ligand was in the complex with the larger radius. The DLS measurements showed the presence of two populations of species (FIG. 4H): a smaller sized species (Rh of 10 nm) and larger species (Rh values in range of 180-290 nm and higher); these species are presumably various length MWNTs and their bundles coated with a layer of BSM.

Quantification Experiments

In order to evaluate the separation/purification protocols, a series of quantification experiments was performed in which the mucin-$C_{60}$ complexes were quantified before and after separation by means of gel permeation chromatography, using the Bio-Rad assay. These quantification experiments showed that about 70% of all injected protein was recovered after the chromatography, clearly indicating that a majority of the mucin-ligand complexes are materials suitable for liquid chromatography.

Nano-Scale Structure of the Complexes

In addition to the above-described analytical methods, which allowed investigation of bulk properties of the BSM and its complexes, Scanning Transmission Electron Microscopy (STEM) and Atomic Force Microscopy (AFM) imaging techniques have also been utilized to investigate the structures of these materials on the nano-scale.

Solutions of BSM and its $C_{60}$, IF-$WS_2$ and MWNT complexes were deposited on a holey carbon-formvar support.

Native Mucin on a Surface

Figure 5A:
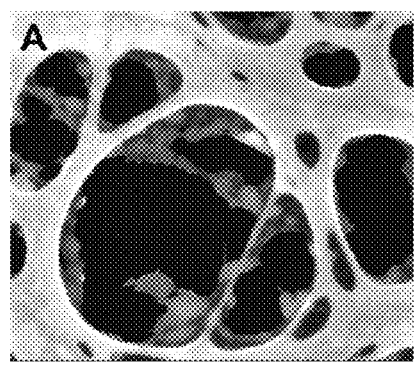
Figure 5B:
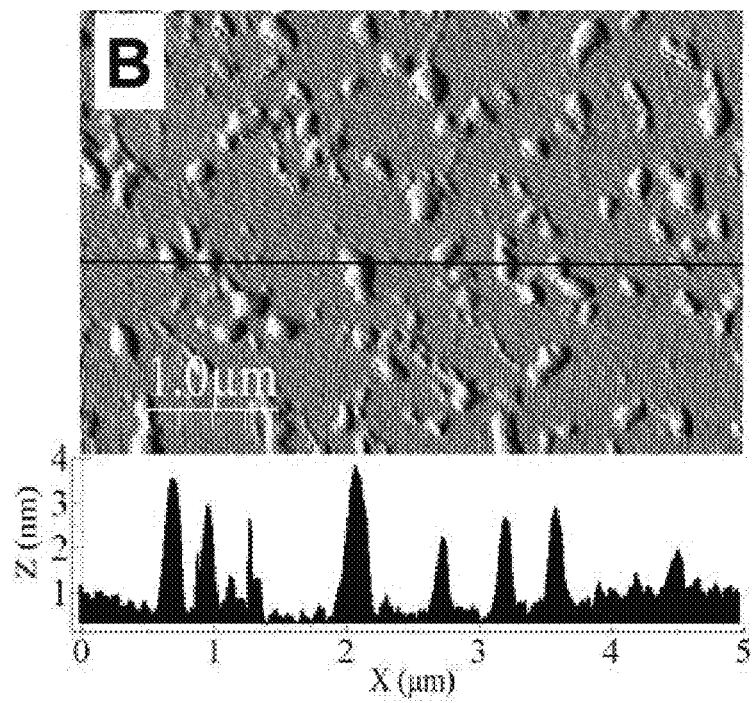

Applicants found that BSM formed a thin film, stable enough to cover micron-sized holes on hydrophobic surface of the holey carbon-formvar support. The structure of the support could be very clearly observed beneath the glycoprotein layer (FIG. 5A). Aggregates with diameters in a range of 200 to 400 nm were also observed. The BSM film morphology on a mica support was analyzed by AFM, which also showed presence of BSM aggregates (FIG. 5B). The AFM imaging demonstrated the presence of aggregates of BSM oligomers with heights of 3-4 nm and diameters of approximately 300 nm.

These analyses of surface-deposited native BSM were in agreement with the above-described DLS studies, which indicated that BSM oligomers averaged 140 nm in solution. Some possible sources to the difference in average aggregate size observed in solution and on surface are precision and orientation-averaging of the DLS measurements and possible flattening of the aggregates on the surface, which may increase the aggregate diameter.

STEM analysis of surface-deposited BSM-ligand complexes revealed that these complexes exhibit significantly different surface morphologies than the native mucin.

Mucin-$C_{60}$ Complex on a Surface

Figure 5C:
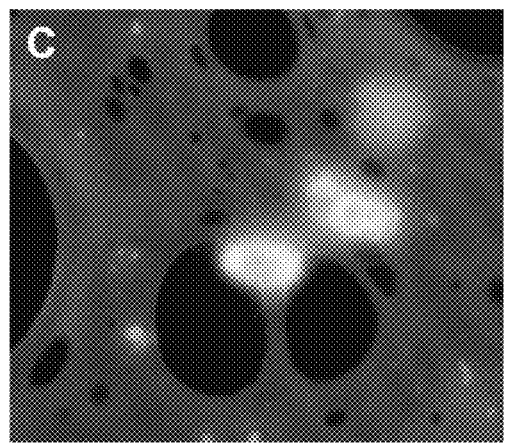
Figure 5D:
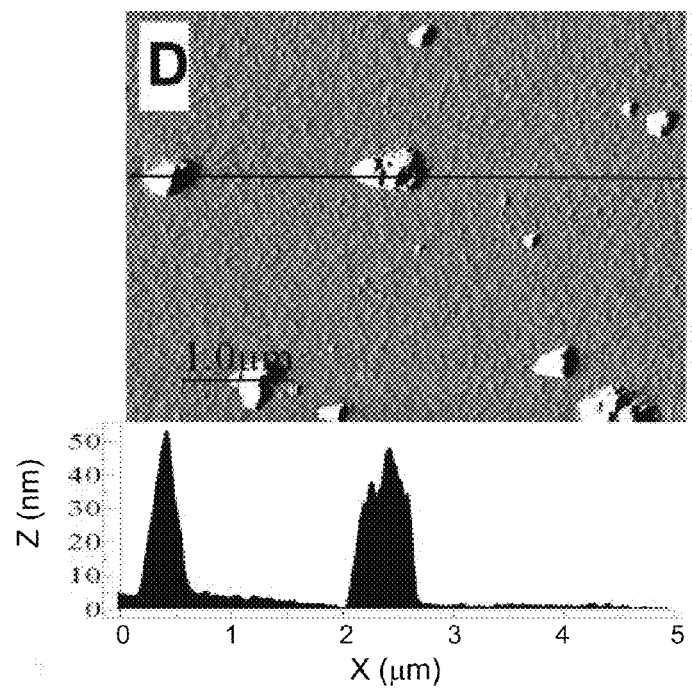
Figure 5E:
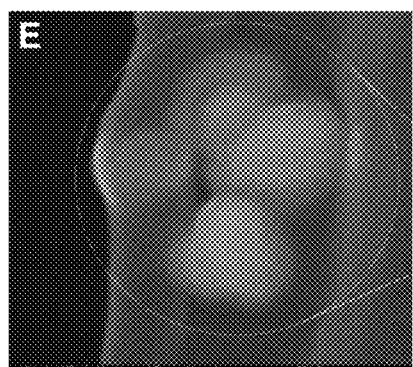
Figure 5F:
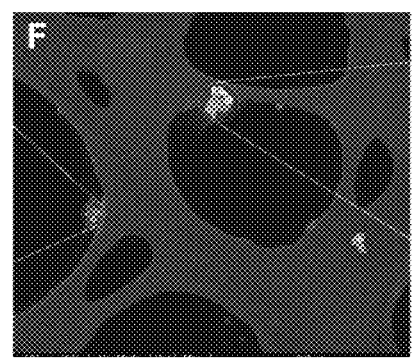
Figure 5G:
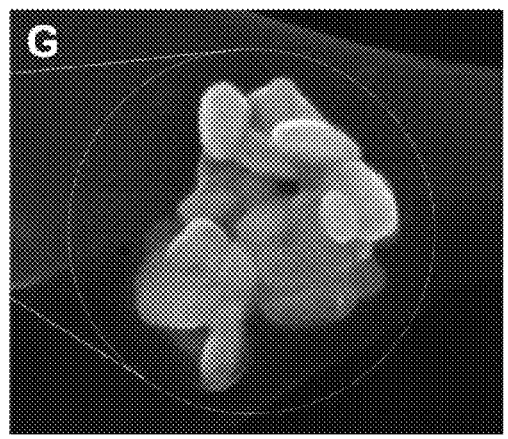
Figure 5H:
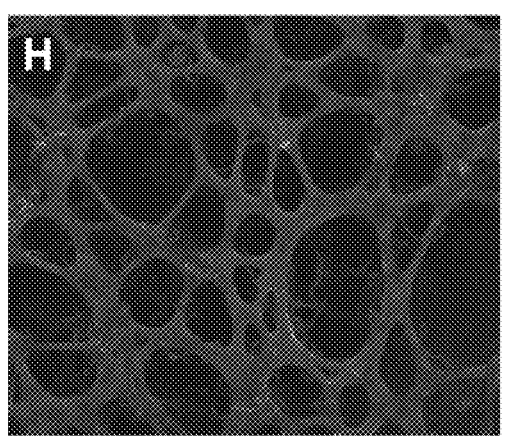
Figure 5I:
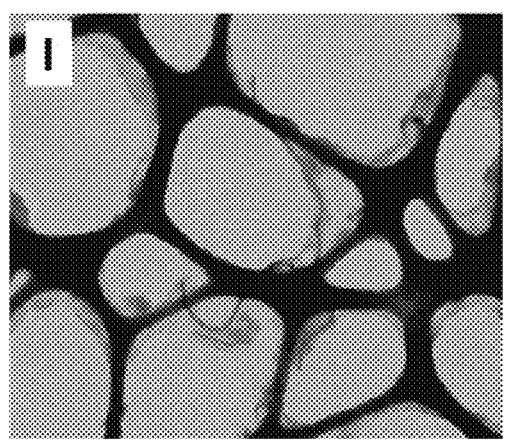
Figure 5J:
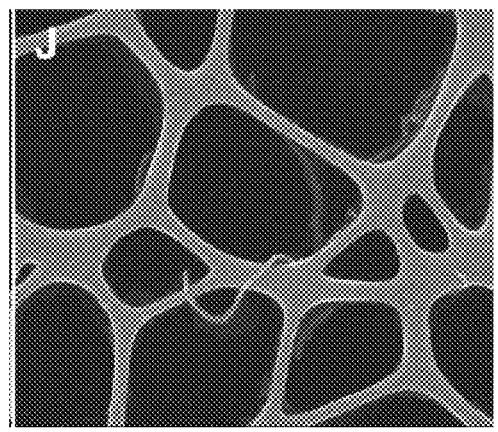
Figure 5K:
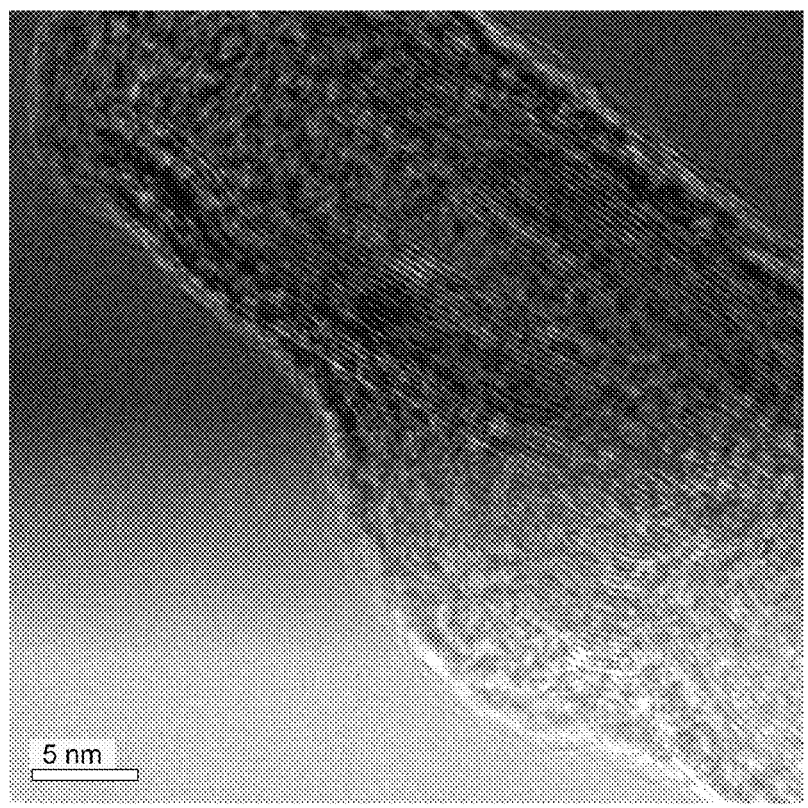

STEM images of the mucin-$C_{60}$ complex showed that on the holey carbon-formvar support, the complex did not form films; rather, when incorporated into BSM, the $C_{60}$ ligands adopted a cluster arrangement. The $C_{60}$ aggregates appeared as bright areas on the STEM image and had sizes in a range of 400 to 800 nm (FIG. 5C). AFM images of the surface-deposited mucin-$C_{60}$ complex revealed nano-structures with widths of 600-800 nm and heights of about 45 nm (FIG. 5D).

Mucin-IF-$WS_2$ Complexes

In the STEM image of the mucin-IF-$WS_2$ complexes, the contrast between the surface of the holey carbon-formvar support and the deposited material was sharp, due to the high electron density of the inorganic fullerenes (FIG. 5).

The STEM revealed that the glycoprotein forms film-like structures, coating IF-$WS_2$ aggregates with sizes ranging from 200 and 400 nm. All the aggregates were comprised of different numbers of single, closed-shell IF-$WS_2$ nanoparticles, each having an approximate size of 100 nm. These observations are in agreement with the above-described DLS results, which indicated formation of 180 nm (in radius) species upon IF-$WS_2$ complexation by the BSM. In order to verify the nature of the guest species, the mucin-IF-$WS_2$ complex specimens were also examined by Energy Dispersive X-ray (EDX) spectroscopy, which clearly showed the presence of sulfur and tungsten atoms (with signals of Cu and Ni atoms belonging to a grid support).

Mucin-MWNT Complex

Interestingly, STEM and TEM images of the mucin-MWNT complex revealed the presence of discrete nanotubes coated by a film of BSM (FIGS. 5H, 5I, 5J and 5K). The nanotubes typically had lengths ranging from 400 to 1000 nm (some nanotubes reached 1.5 µm). This STEM analysis revealed the remarkable adhesion properties of the BSM glycoprotein, which successfully competes for binding to MWNT with the intermolecular interactions that hold bundles of these nanotubes together.

Determination of Loading Capacity

In order to determine the loading capacity of BSM glycoprotein for the examined ligands, elemental analysis measurements were preformed. The carbon content of each complex (in the case of $C_{60}$ and MWNT containing complexes) was compared to the carbon content found in the native BSM. This was used to determine the amount of ligand in the complex and by that, the mucin-ligand weight ratio (ligand uptake percentage—LUP, Table 1). The applicants found that for the tested ligands, the LUP stood on the average of 15.5%.

Mucin-$C_{60}$ Complex

For the case of mucin-$C_{60}$ complex, the results obtained by the elemental analysis were not obtained by using a different method. In this procedure, the amount of the BSM protein in the mucin complex was analyzed by a periodic acid/Schiff (PAS) assay.

In more detail, in order to determine the amount of $C_{60}$, a hydrolysis-extraction process was used which included heating of the complex in a heterogeneous mixture of hydrochloric acid and chloroform at 80° C., in a sealed vessel, and then the amount of a chloroform-extracted ligand was determined by UV-vis spectroscopy. Using this method, it was found that the LUP was 15.1%, strongly supporting the result obtained by the elemental analysis.

Additional calculation determined the average number of bound ligand (NBL) per BSM monomer by multiplication of the LUP value by the BSM monomer-to-ligand molecular weight ratio (Eq. 2). In this case, it was found that the complex comprises an average of 40 ligands per monomeric unit of BSM.

$$NBL = LUP \times \frac{\text{MW of } BSM\text{'s Monomer}}{100\% \times (\text{MW of Ligand})} \qquad \text{Eq. 2}$$

Role of the Mucin Saccharides in the Binding of Tested Ligands

Determining the mucin structural features responsible for the binding of the tested nanomaterials was a challenging task, as mucins have amorphous structures. Due to a heavy glycosylation of the mucin protein backbone, it was assumed that the oligosaccharide residues were mostly responsible for ligand binding.

To evaluate this assumption, a deglycosylated form of BSM (dBSM) was prepared and repeated binding experiments with this modified protein were carried out. Complexes of $C_{60}$ with dBSM were prepared as described above for the complexation with BSM.

dBSM was prepared by base-catalyzed β-elimination of periodate-oxidized glycans, using method reported by Kim and coworkers [6]. By analyzing the resulting dBSM protein using the PAS assay, it was found that, on average, the degree of deglycosylation was 54±5% relative to the oligosaccharide content of the starting material (corresponding to a dBSM monomer molecular weight of approximately 109 KDa).

It was also found that in comparison to the native BSM protein, the uptake capacity of the dBSM was considerably lower (1.4% or 2 ligand molecules per monomeric unit).

The subsequent series of complementary experiments was designed to examine capabilities of different size oligosaccharides to bind selected hydrophobic ligands.

Representative oligosaccharides, including β-cyclodextrin, starch, arabic acid and lactose, were incubated with $C_{60}$, according to the described above protocol for the BSM complexes preparation. In these experiments, no $C_{60}$ was detected in the solution; neither by UV-vis or SEC-HPLC. Therefore, it is believed that interactions between the saccharide residues and the polypeptide backbone in a sugar-substituted polypeptide dictate certain arrangements of the saccharide moieties in space, and these arrangements play a role in the complexation of various hydrophobic materials.

Polyaromatic Hydrocarbons

Complexes of polyaromatic hydrocarbons (PAHs) with mucin were prepared in a procedure similar to that described above. The PAHs used in these studies were anthracene (Ant), benzo[a]pyrene (Bap) and coronene (Cor).

UV-VIS and Fluorescence Spectra of the Prepared Mucin-PAHs Complexes

UV-vis and fluorescence spectra that were measured for each of the BSM-ligand complexes reveal that mucin was capable of inducing solubilization in aqueous solution of all of the aforementioned PAHs. As shown in FIG. 6, all UV-vis spectra of the obtained complexes demonstrated superimposition of characteristic BSM peaks (at 280 nm) with absorbance peaks belonging to the bound ligands.

It was found that BSM-complexed Ant, Bap and Cor exhibited line-broadening and bathochromic shifts (FIG. 6B-6D and Table 2) when compared to spectra of the non-complexed ligands in chloroform.

TABLE 2

Summary of UV-vis spectral data of evaluated ligands and BSM complexes.

| | Ligand | $\lambda_{max-Abs.}$ (in CHCl$_3$) [nm]$^a$ | $\lambda_{max-Abs.}$ (BSM complex in buffer) [nm]$^b$ |
|---|---|---|---|
| 1. | Ant | 255, 340, 358, 378 | 251 (br), 352, 372, 394 |
| 2. | Bap | 234, 267, 286, 295, 350, 360, 388, 404 | 231, 272, 349, 366, 390, 402 |
| 3. | Cor | 234, 292, 304, 341 | 296 (br), 355 |
| 4. | C$_{60}$ | 258, 329 | 217, 264, 342, 456 |
| 5. | IF-WS$_2$ | N/A | 226, 268, 480, 543, 647 |
| 6. | MWNT | N/A | 230, 270, 406 |

$^a$N/A—data not available;
$^b$br—broad peak

Anthracene (Ant)

Figure 6A:
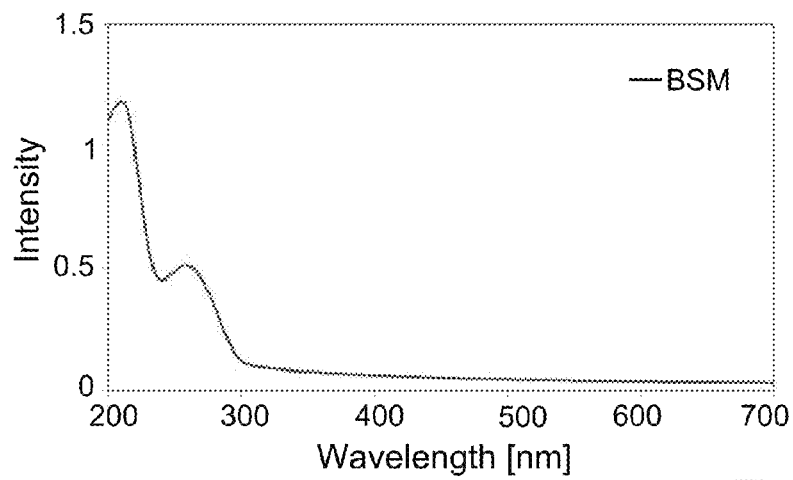
Figure 6B:
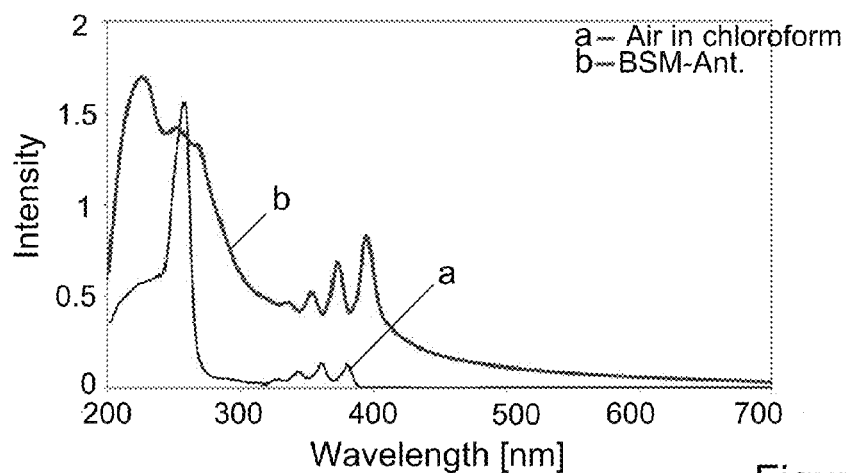

The UV-vis spectrum of the BSM-complexed Ant essentially preserved its well-resolved features, strongly suggesting that the protein was bound to a monomer of this PAH (FIG. 6B).

Benzo[a]Pyrene (Bap) and Coronene (Cor)

Figure 6C:
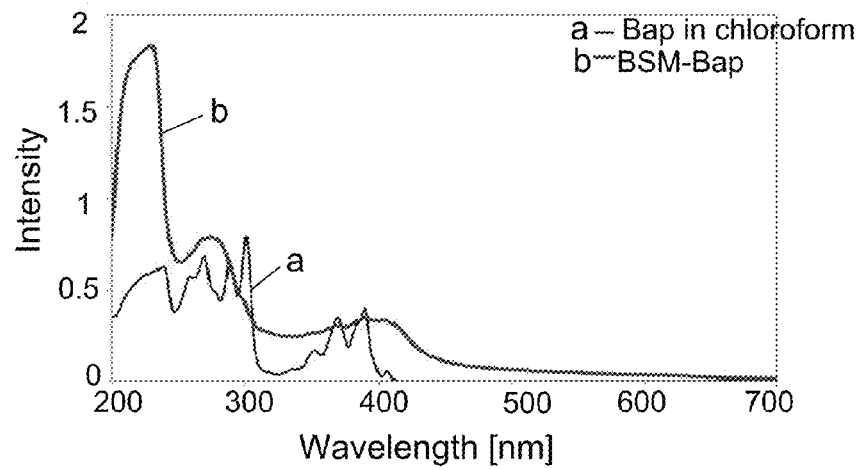
Figure 6D:
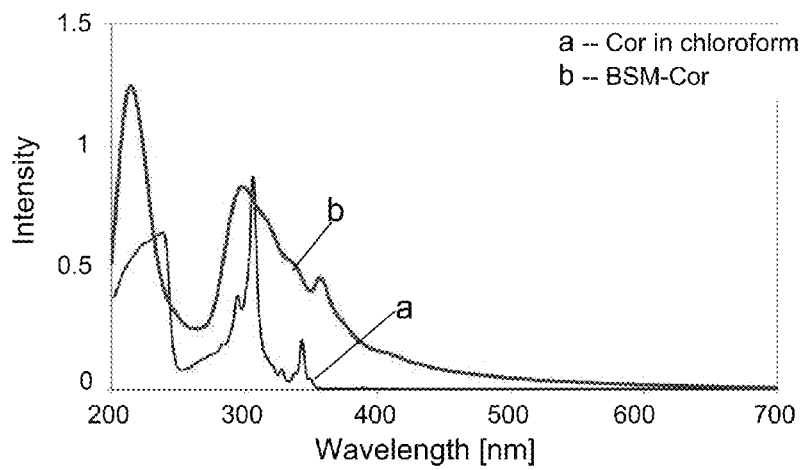
Figure 7A:
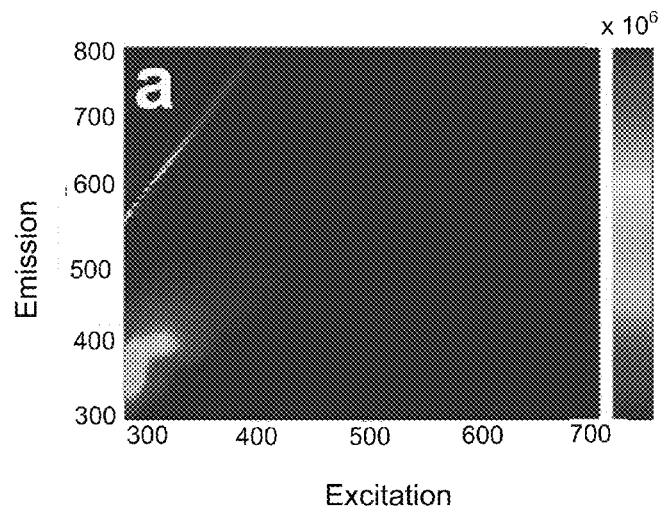
Figure 7B:
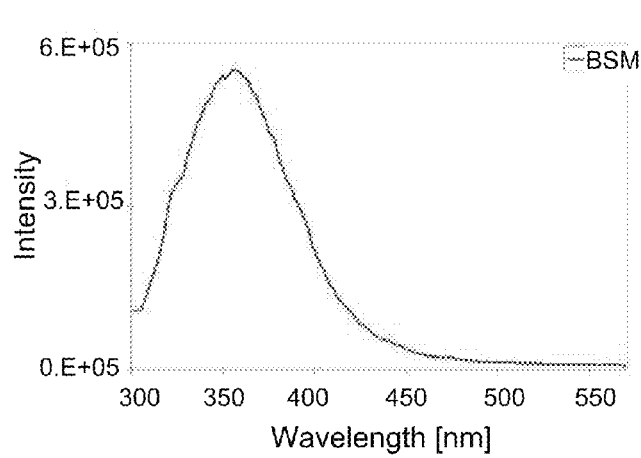
Figure 7C:
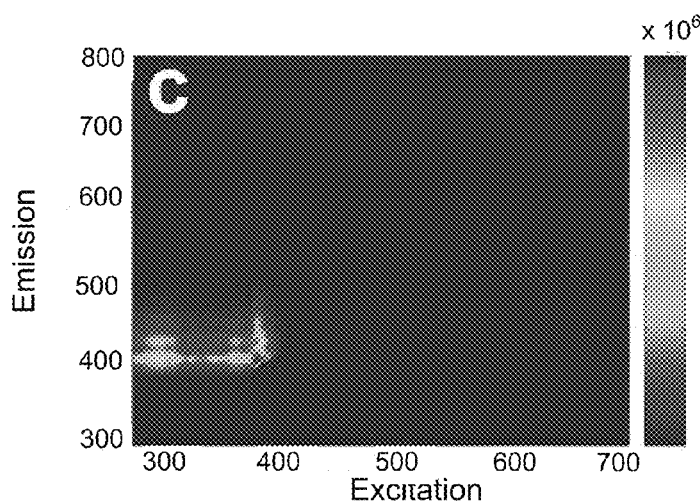
Figure 7D:
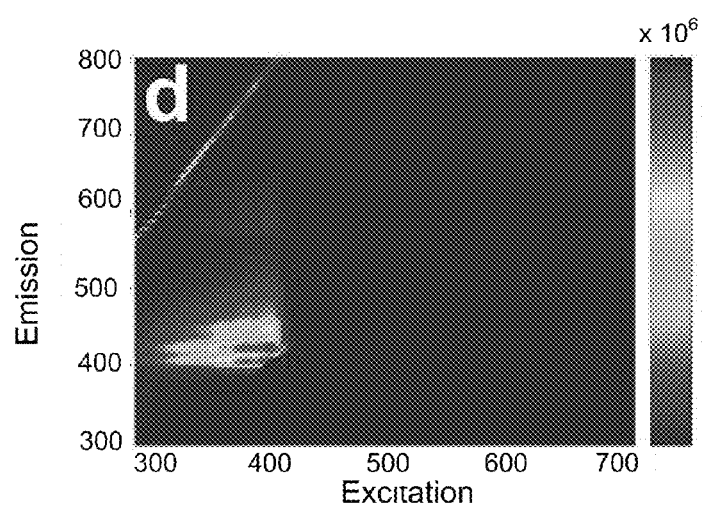
Figure 7E:
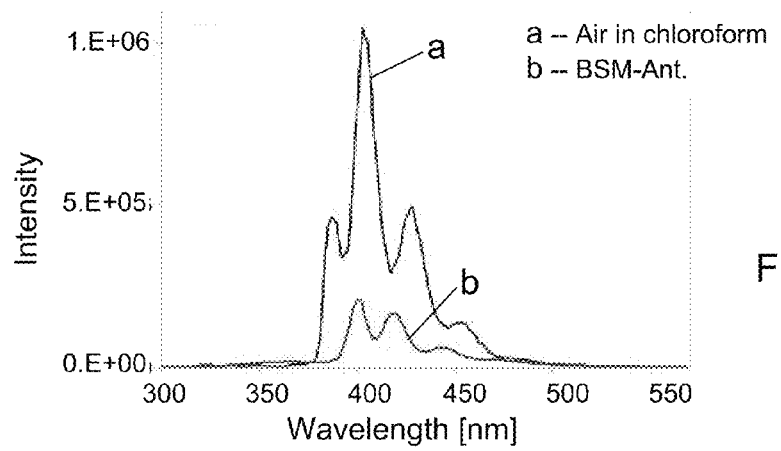
Figure 7F:
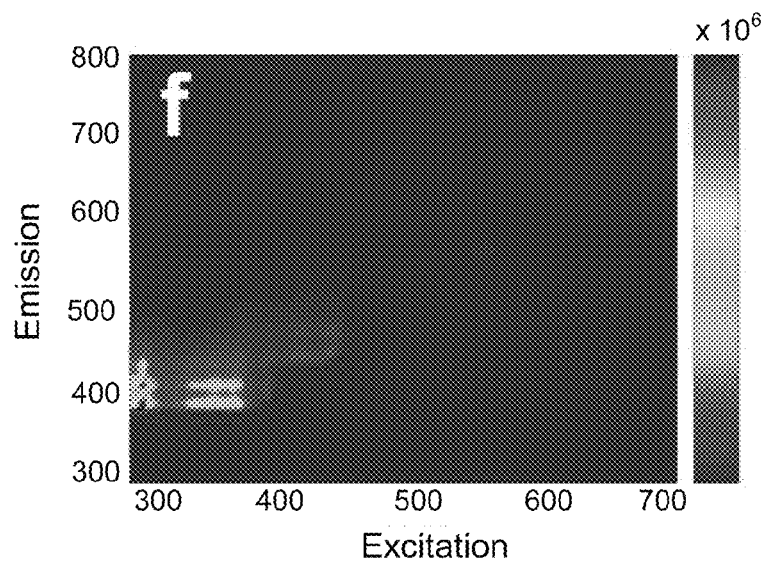
Figure 7G:
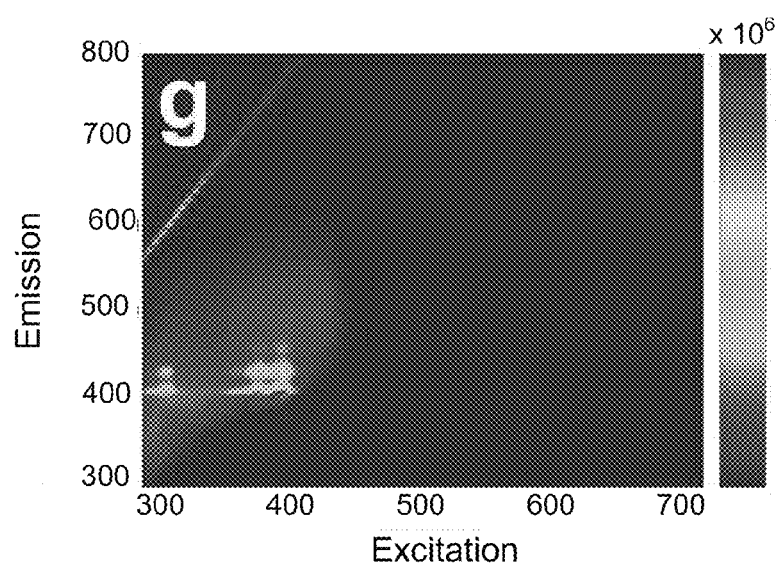
Figure 7H:
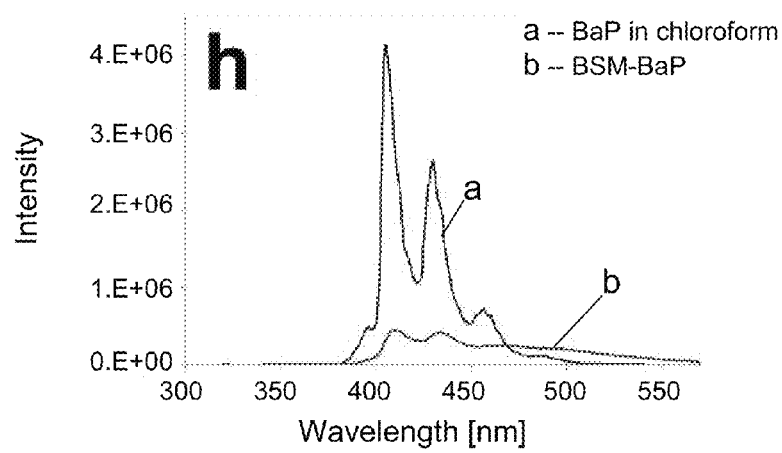
Figure 7I:
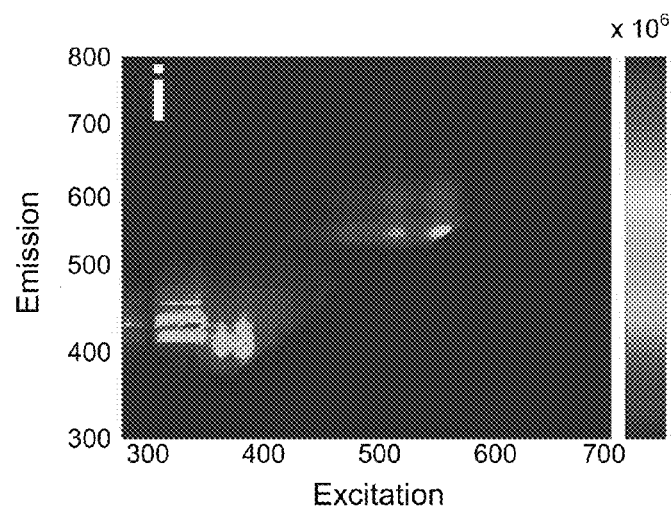
Figure 7J:
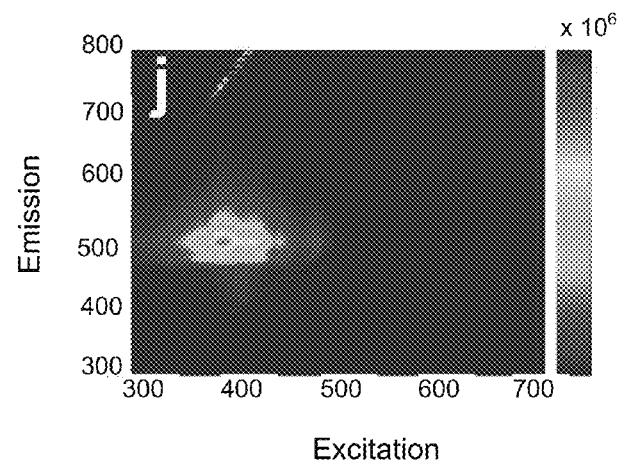
Figure 7K:
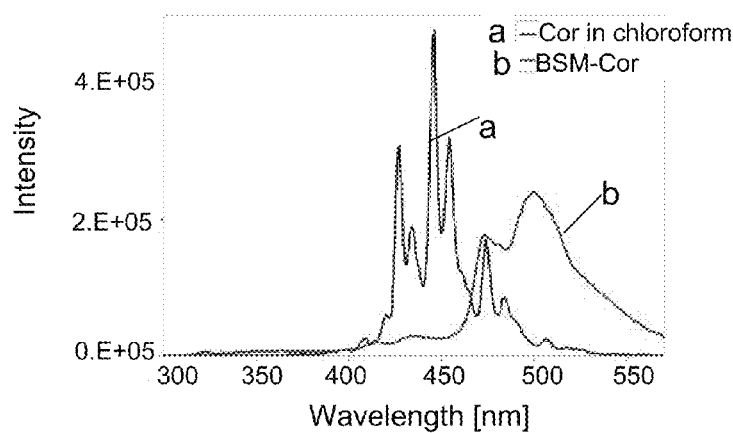

In contrast to Ant, the UV-vis spectra of mucin complexes of Bap and Cor showed loss of fine structure. This may indicate that the larger ligands are bound to BSM in a form of π-π stacked dimers or even larger aggregates (FIGS. 6C, 6D). Additional contribution to this effect could be attributed to solvophobic interactions, which reduce the vibronic bands of the corresponding spectra.

3D Excitation-Emission Fluorescence Spectroscopy

Complexation modes of the evaluated ligands were further investigated using three-dimensional excitation-emission fluorescence spectroscopy. The applicants found that mucin-complexed Ant, Bap and Cor exhibited significant decreases in fluorescence intensity. The applicants observed bathochromic shifts in maximum emission wavelengths from 15 nm (for Ant and Bap) to 55 nm (for Cor) as compared to fluorescence spectra of non-complexed ligands in chloroform solutions (FIG. 7 and Table 3). Despite the shift, the fluorescent spectrum of mucin-complexed Ant had most of the well-resolved features of the free ligand. In contrast, significant changes were observed in the shapes of the fluorescence spectra of the bound Bap and Cor compared to the spectra of the chloroform solutions of the free ligands.

TABLE 3

Summary of fluorescence spectral data of evaluated ligands and BSM-ligand complexes.

| Ligand | $\lambda_{max-Em}$ (in CHCl$_3$) [nm]$^b$ | $\lambda_{max-Em}$ (BSM complex in buffer) [nm]$^b$ |
|---|---|---|
| Ant | 387, 402, 428, 453, 483 (br) | 404, 149, 444, 473 (br) |
| Bap | 396, 405, 430, 457, 488 (br) | 410, 434, 470 (br), 499 (br) |
| Cor | 409, 420, 427, 434, 446, 454, 474, 484, 507, 523 (br) | 419, 435, 474, 500 |

$^a$Measured at $\lambda_{Exc}$ of 290 nm; BSM protein exhibits a low emission at 357 nm;
$^b$br—broad peak In the case of Cor, the large red shift in the maximum emission of the complex could not be attributed to solvatochromism alone. It may be assumed that discotic Cor ligands are bound to BSM glycoprotein in the form of π-π stacked clusters, and these bindings contribute significantly to red shift. This explanation is in line with the above-suggested interpretation of the UV-vis spectroscopy as showing that Cor binds as an aggregate.

Complex Size Evaluation

Further characterization and evaluation of overall sizes of the BSM complexes were performed using dynamic light scattering (DLS) and high performance size-exclusion liquid chromatography (SEC).

Anthracene-Mucin Complex

Figure 8A:
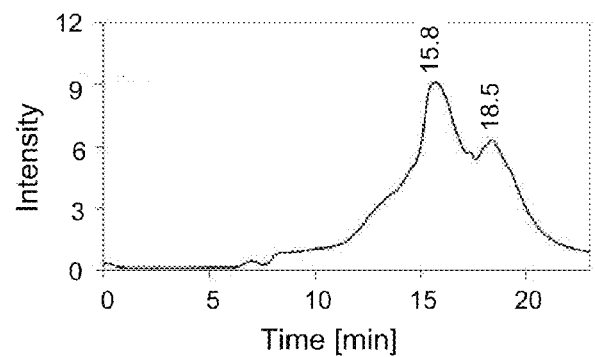
Figure 8B:
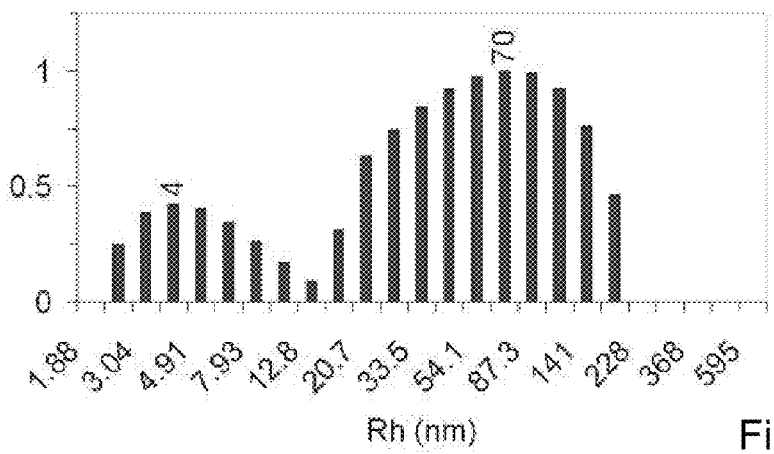
Figure 8C:
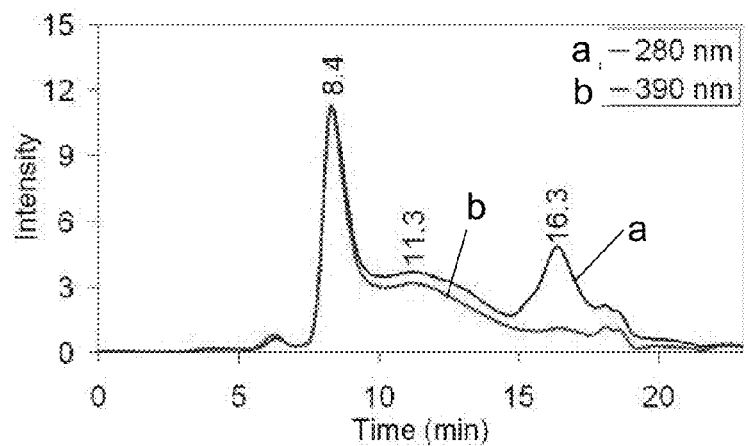

SEC analysis of mucin-Ant complexation products indicated formation of larger aggregates not found in the native BSM protein chromatogram (FIG. 8C). A fraction of the population (peaks at retention time of 16.1 and 18.7 min) had retention times similar to those observed in the chromatogram of BSM; however, most of the material eluted at retention times of 11.3 and 8.4 min, corresponding to higher molecular weight species (monitored at 280 nm). The chromatogram monitored at 390 nm, a wavelength at which only the Ant chromophore is observed, revealed that most of the Ant ligand was located in these new products and only a small amount of the ligands was bound by species corresponding in size to the native BSM.

Figure 8D:
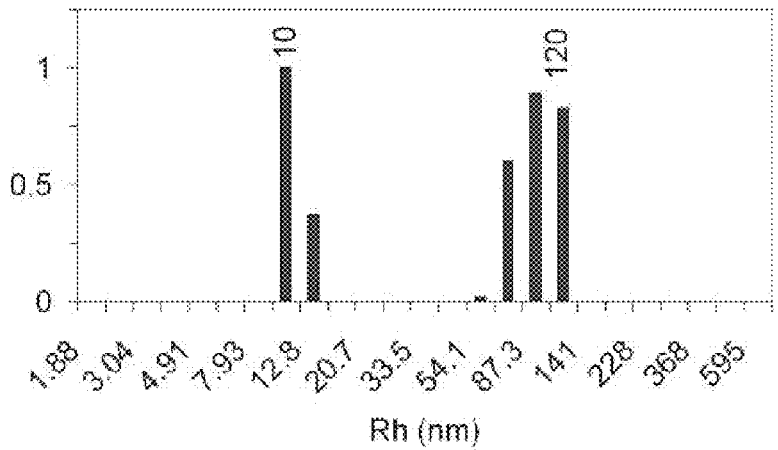

DLS analysis of the mucin-Ant complexation products showed two relatively narrow populations of species (FIG. 8D). The smaller sized species with Rh of 10 nm are presumably BSM dimers, whereas the larger species with Rh of 120 nm correspond to oligomers of BSM and to mucin-Ant complexation products.

Bap-Mucin Complex

Figure 8E:
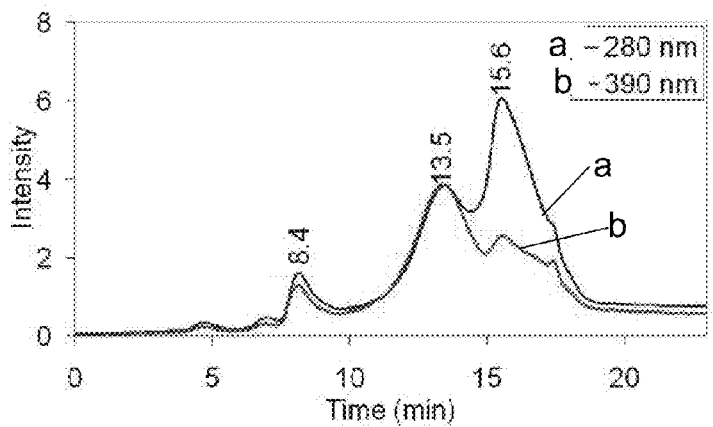

SEC analysis of mucin-Bap complexation products also showed formation of large size products (FIG. 8E). The chromatogram measured at 280 nm showed that although a considerable population of species had the same elution time as the BSM protein (peak at 15.6 min), a significant portion of the material eluted at the retention times of 13.5 and 8.4 min. The SEC chromatogram monitored at 390 nm (wavelength at which only the Bap chromophore is observed) revealed that although the Bap ligand was present in all species, the host-to-ligand ratio in larger entities was substantially higher than in species that eluted at 15.6 min.

Figure 8F:
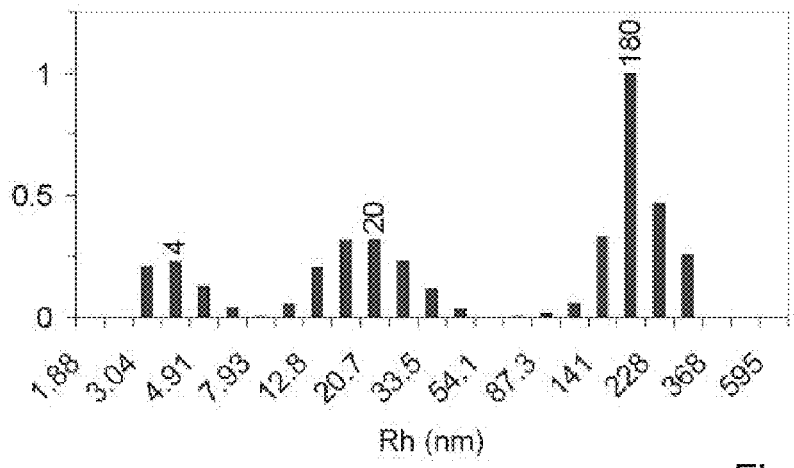

The DLS analysis of mucin-Bap complexation products indicated the presence of two major and one minor population of species (FIG. 8F). The lower molecular weight species, with Rh of 4 nm, were attributed to monomers of BSM and the larger species, with Rh values of 21 and 179 nm, correspond to mucin-Bap complexation products.

Coronen-Mucin Complex

Figure 8G:
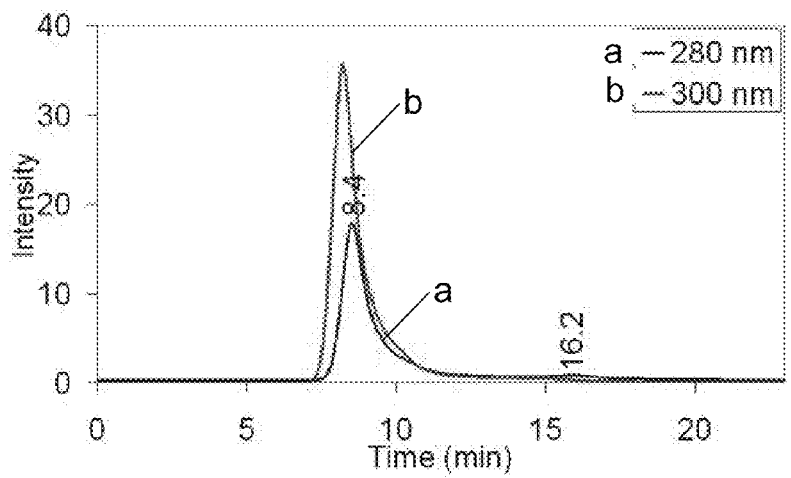
Figure 8H:
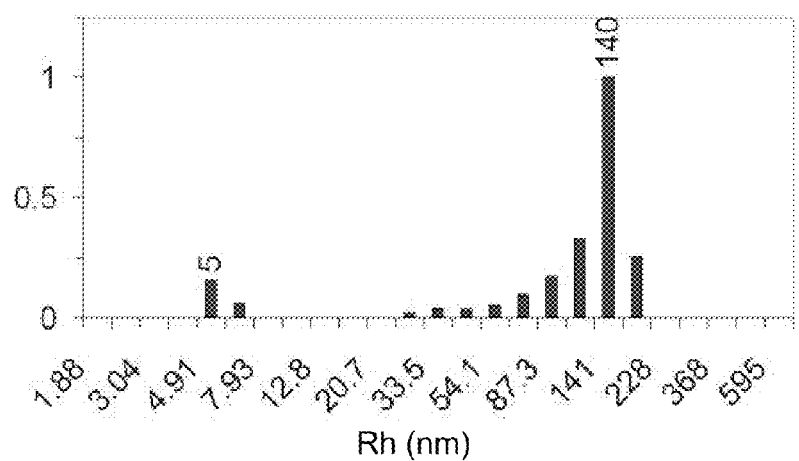

The Cor complex with BSM gave results similar to those obtained with Bap. SEC analyses of the complex showed practically complete transformation of the starting BSM protein into larger, ligand-loaded entities (eluting at the retention time of 8.4 min, FIG. 8G). The DLS analysis of mucin-Cor complexation product also showed a presence of one major population with Rh values of 140 and 180 (FIG. 8H).

Based on UV-VIS, DLS, and SEC results, it is suggested that there are various modes by which hydrophobic ligands bind to sugar-substituted polypeptides. In one such mode, which was more pronounced with smaller hydrophobic ligands, the ligands bind inside small hydrophobic cavities in the mucin structure. In another mode, more pronounced with larger cluster-forming compounds, such as Cor that has large hydrophobic surfaces, several BSM oligomers are recruited for "coating" ligand molecules, creating submicron-size nanostructures.

It was found that practically all available BSM participated in solubilizing the PAHs.

Quantification Experiments

In order to evaluate the separation/purification protocols, a series of quantification experiments was performed in which the mucin-PAH complexes were quantified before and after gel permeation chromatography separation, using the Bio-Rad assay. These quantification experiments showed that about 70% of all injected protein was recovered after the chromatography, clearly indicating that majority of the protein-ligand complexes are materials suitable for liquid chromatography.

Nano-Scale Structure of Cor-Mucin Complex

In addition to the analytical methods which allowed investigation of bulk properties of the BSM and its complexes, Scanning Transmission Electron Microscopy (STEM) imaging technique was employed to investigate these materials structures on a nano-scale.

Solutions of BSM and its Cor complex were deposited on a holey carbon-formvar support. Results with native mucin were described above.

Figure 9A:
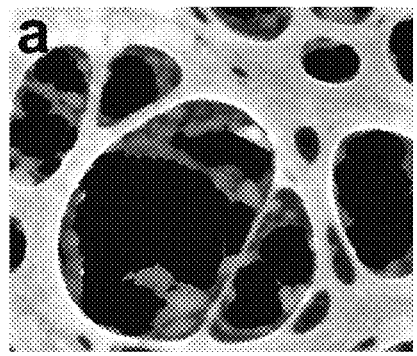
Figure 9B:
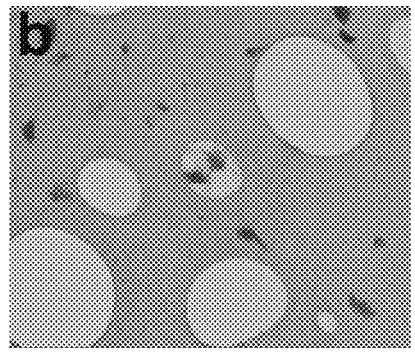
Figure 9C:
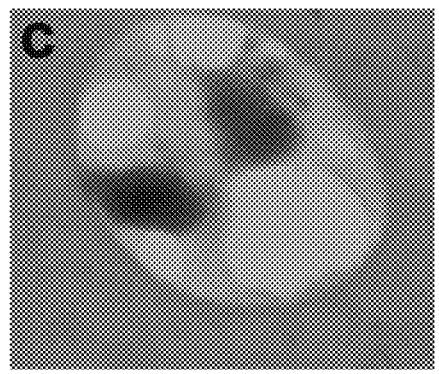
Figure 10A:
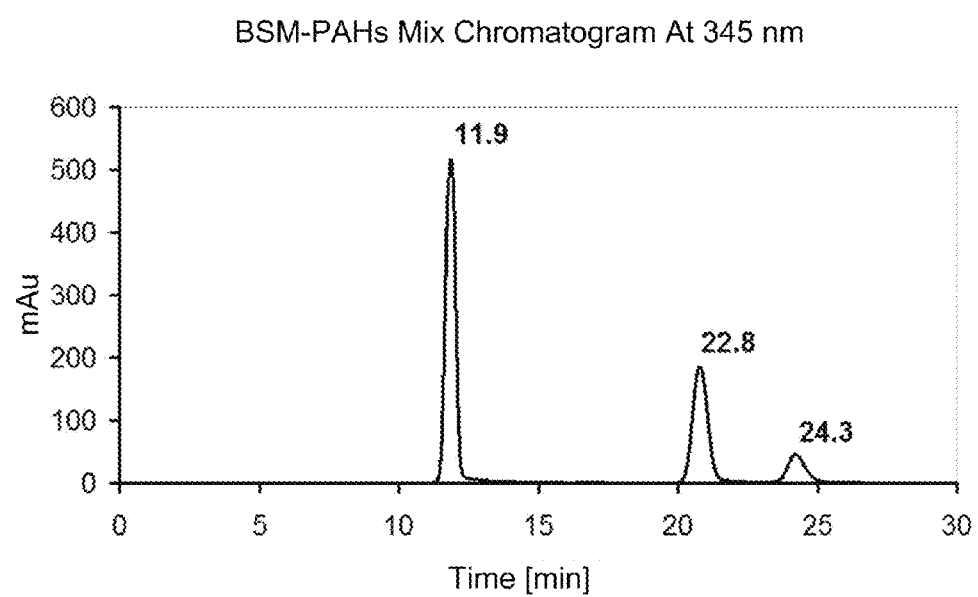
Figure 10B:
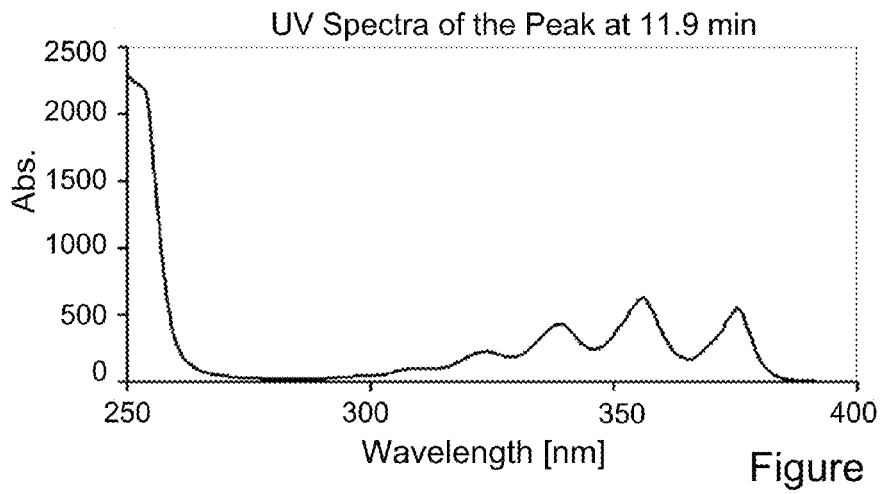
Figure 10C:
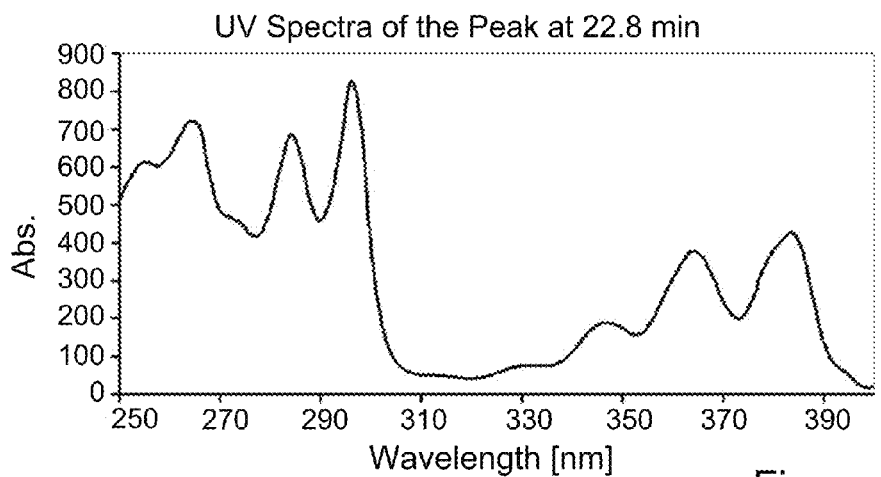
Figure 10D:
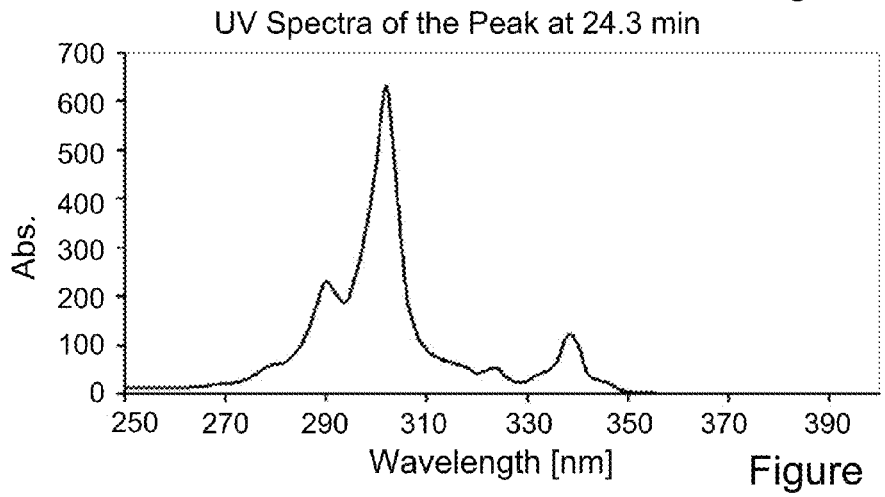

STEM analysis of surface-deposited BSM-Cor complex revealed that these hybrid materials exhibit significantly different surface morphologies than their parent glycoprotein. The STEM images of BSM-Cor showed that this complex did not form large-area films; the BMS-Cor complexes adopted cluster arrangements that appear as dark areas inside a protein envelope (FIGS. 9B, 9C). The sizes of these protein-engulfed clusters were in the range of 200 nm, which is in a good agreement with the DLS measurements for the BSM-Cor aggregates in solution (taking into account structure flattening due to a surface deposition).

Determination of Loading Capacity

In order to ascertain the capacity of BSM glycoprotein for various ligands, the amounts of Ant, Bap and Cor ligands in corresponding BSM complexes were determined. The amount of the BSM protein in each BSM complex was analyzed by a periodic acid/Schiff (PAS) assay.

In order to determine the amount of ligand in each complex, the above-described hydrolysis-extraction process was employed and determined the amount of chloroform-extracted ligand by UV-vis spectroscopy.

It was found that ligand-to-BSM weight ratio (ligand uptake percentage—LUP) increased as the molecular weight of the ligand increased (Table 1 below). The LUP values were calculated by dividing the amount of the extracted ligand by the amount of the BSM protein present in the complex. The mucin-Ant complex had the lowest ratio (4.5%) and the Coronene complex had the highest (7.7%). The average number of bound ligands (NBL) per BSM monomer was also calculated by multiplication of the LUP value by the BSM monomer-to-ligand molecular weight ratio, as discussed above. Results are summarized in Table 1.

It was found that for all analyzed complexes, the number of bound ligand molecules was very similar (with an average of 40 ligands per a single monomeric unit of BSM). Although surprising, these findings indicated that BSM did not have a strong preference for any one of these hydrophobic ligands over the others.

Interestingly, it was also found that upon applying competitive complexation conditions (e.g. incubating BSM solution with a mixture of the three tested PAHs) and analyzing the extracted ligands from the complex, a distinct preference towards the smaller PAHs was observed. HPLC separation of the organic extraction from the complex, showed that although the BSM is capable of binding the three PAHs simultaneously, its preference to bind the PAH decreases as the molecular weight of the ligand increases (FIG. 10).

Without being bound to theory, this effect could be explained by the water solubility of the different PAHs. Specifically, the Anthracene is smaller, more soluble ligand and therefore, its availability for the complexation process was greater.

Role of the Mucin Saccharides Binding the Tested Ligands

A deglycosylated form of BSM (dBSM) was prepared and the binding experiments with this protein were repeated. Complexes of Ant, Bap and Cor ligands with dBSM were prepared as described above for the complexation with BSM. dBSM was prepared as described above in the context of fullerene, nanotubes, and inorganic nano structures.

In a series of binding studies, also summarized in Table 1 it was found that in comparison to the native BSM protein, the uptake capacity of the dBSM was considerably lower for all tested ligands, clearly demonstrating the key role of the oligosaccharide moieties in binding of hydrophobic ligands.

The subsequent series of complementary experiments was designed to examine capabilities of different size oligosaccharides to bind selected hydrophobic ligands. Representative oligosaccharides, including β-cyclodextrin, starch, arabic acid and lactose, were incubated with Ant, Bap and Cor ligands, according to the described above protocol for the BSM complexes preparation. The LUP values were calculated by dividing the amount of the dissolved ligand by the amount of the oligosaccharide present in the complex (if formed). No clear preference was for binding of particular ligands to certain oligosaccharides. In comparison to BSM, the dissolution capability of arabic acid was drastically lower for all tested ligands. It was practically negligible in the cases of lactose, β-cyclodextrin and starch (Table 1).

TABLE 1

Summary of quantification results for selected BSM, dBSM complexes and oligosaccharides.

| | BSM | | dBSM | | Arabic Acid | Starch | β-Cyclodextrin | Lactose |
|---|---|---|---|---|---|---|---|---|
| Ligand | LUP (%) | NBLb | UP (%) | NBLc | LUP (%) | LUP (%) | LUP (%) | LUP (%) |
| Ant | 4.5 ± 0.9 | 43 ± 9 | 0.28 ± 0.06 | 2.2 ± 0.3 | 0.56 ± 0.11 | N/D | N/D | N/D |
| Bap | 5.4 ± 1.1 | 36 ± 8 | 0.23 ± 0.05 | 1.2 ± 0.2 | 0.09 ± 0.02 | 0.11 ± 0.02 | N/D | N/D |

TABLE 1-continued

Summary of quantification results for selected BSM, dBSM complexes and oligosaccharides.

| | BSM | | dBSM | | Arabic Acid | Starch | β-Cyclodextrin | Lactose |
|---|---|---|---|---|---|---|---|---|
| Ligand | LUP (%) | NBLb | UP (%) | NBLc | LUP (%) | LUP (%) | LUP (%) | LUP (%) |
| Cor | 7.8 ± 1.5 | 44 ± 9 | 0.61 ± 0.12 | 2.1 ± 0.2 | 0.18 ± 0.04 | 0.18 ± 0.04 | N/D | N/D |
| $C_{60}$ | 15.1 ± 2.4 | 36 ± 6 | 1.41 ± 0.28 | 1.9 ± 0.1 | N/D | 0.35 ± 0.07 | 0.12 ± 0.02 | N/D |

Dye Mixtures

Mixtures of mucin-dyecomplexes were prepared and were found to emit light quasi-independently of each other, in contrast to the same mixtures without the solubilizing agent, e.g., mucin, where only one dye emitted light, due to FRET effect.

In the experiments, three dyes were used: anthracene (referred herein as ant); tris(benzoylacetonato)mono(phenanthroline)europium(III), referred herein as the Eu complex; and tris-(8-hydroxyquinoline) aluminum, referred herein as the Al complex (as ALQ3).

Figure 11:
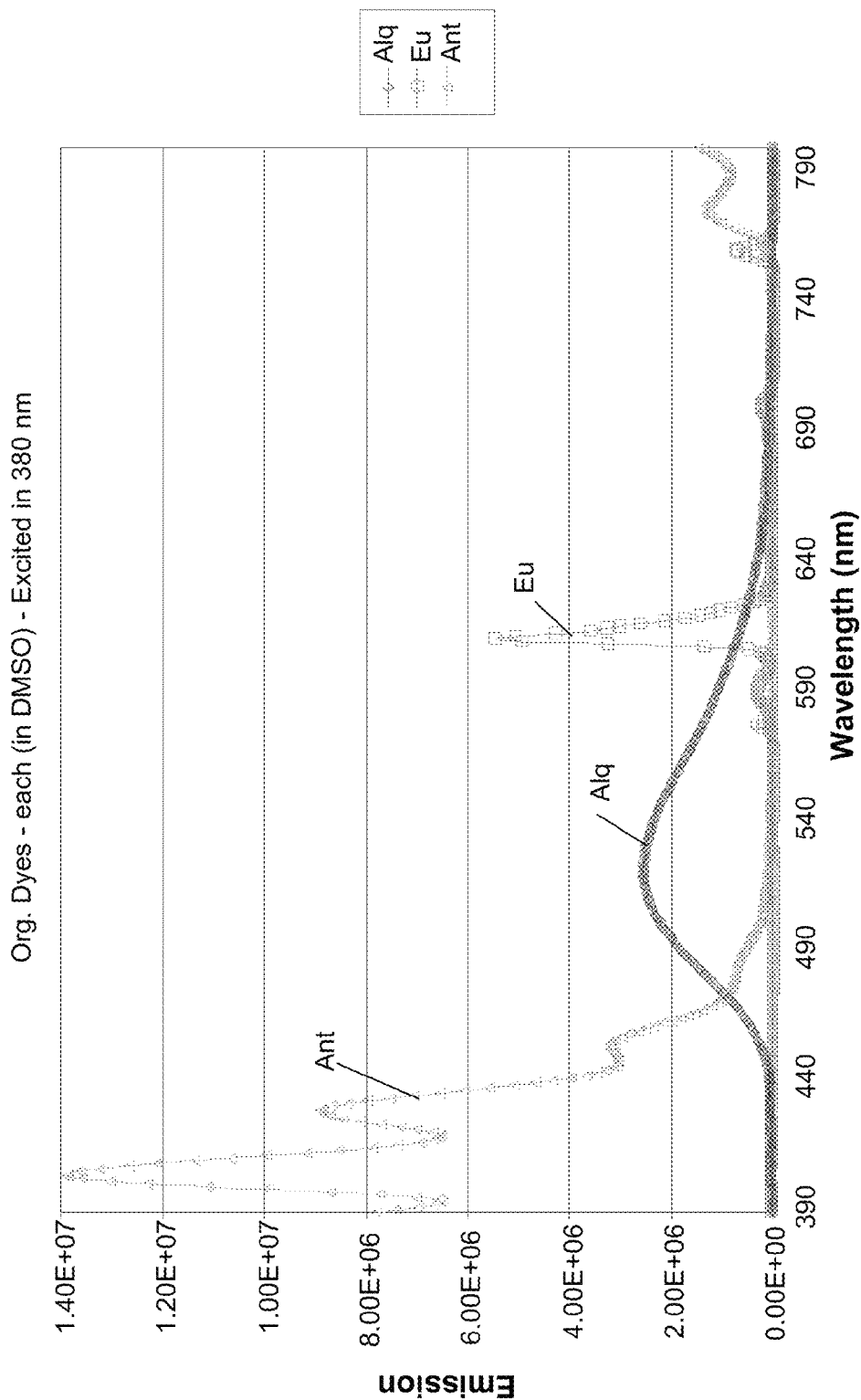

When light emission (in response to illumination at 380 nm) of each of the three dyes was measured in DMSO, the spectra shown in FIG. 11 were obtained. The spectrum of ant shows peaks in the red region (between 400 nm and 450 nm), the spectrum of ALQ3 shows a broad peak around 530 nm and the spectrum of the Eu complex shows a sharp peak at about 615 nm.

Figure 12A:
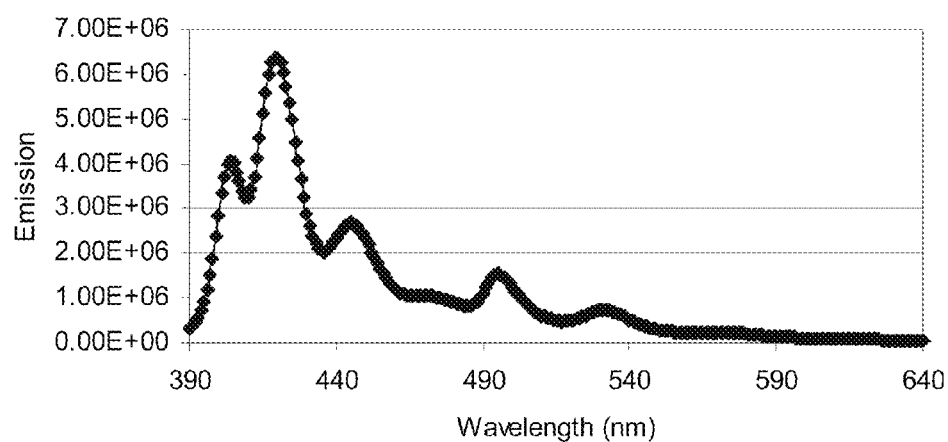
Figure 12B:
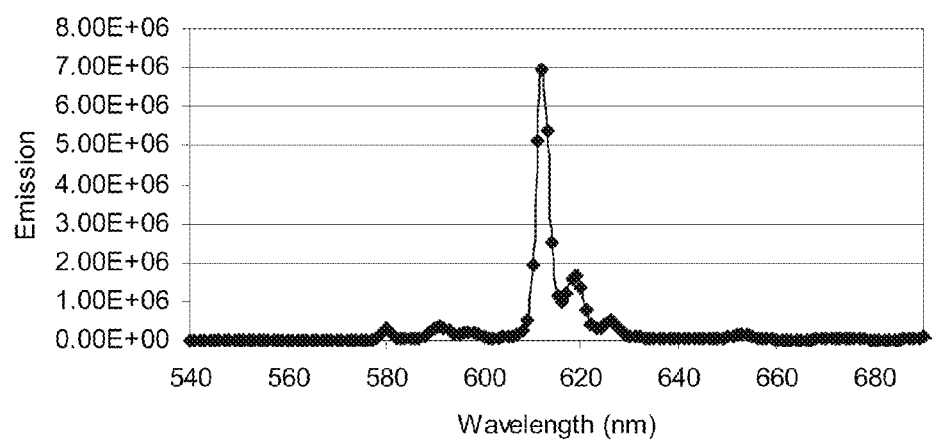
Figure 12C:
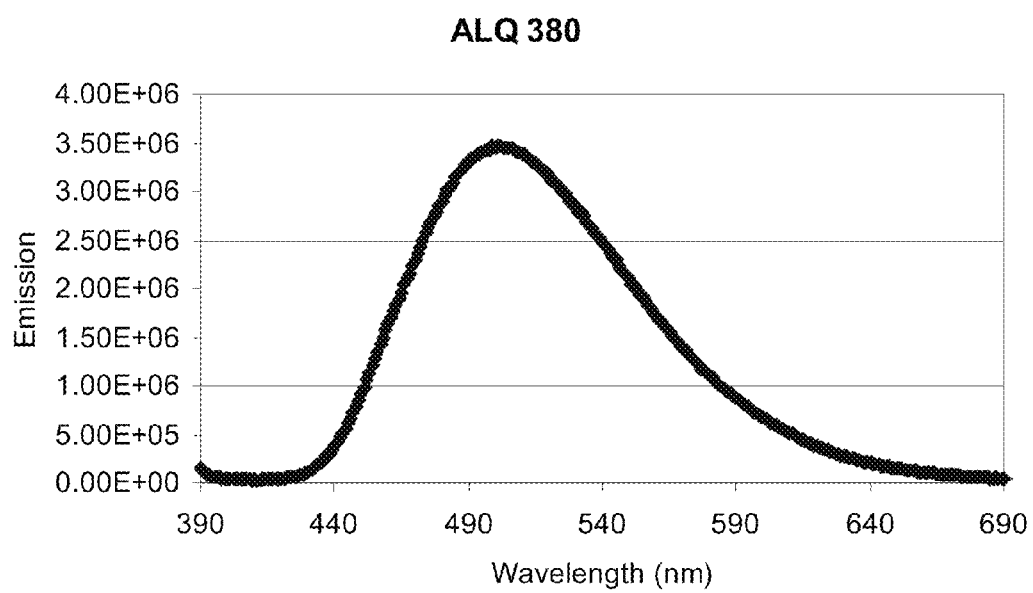

The spectra of the same three dyes, each complexed with mucin in an aqueous solution are reproduced in FIGS. 12A, 12B, and 12C, showing substantially the same peaks that were observed in DMSO.

Figure 13:
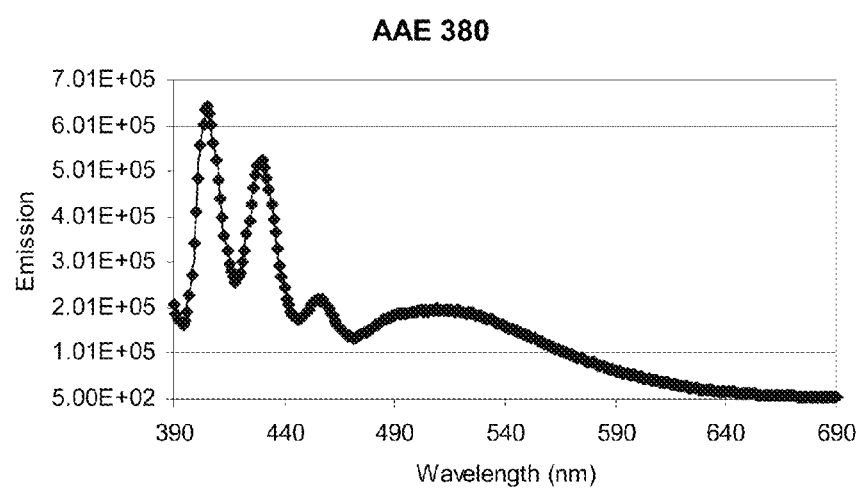

When the three dyes were put in DSM together, the emission spectrum of FIG. 13 was obtained. As clearly shown, the peaks of ant were preserved, while the peaks at 530 nm and 615 nm disappeared. This is a demonstration of the well-known FRET effect.

Figure 14:
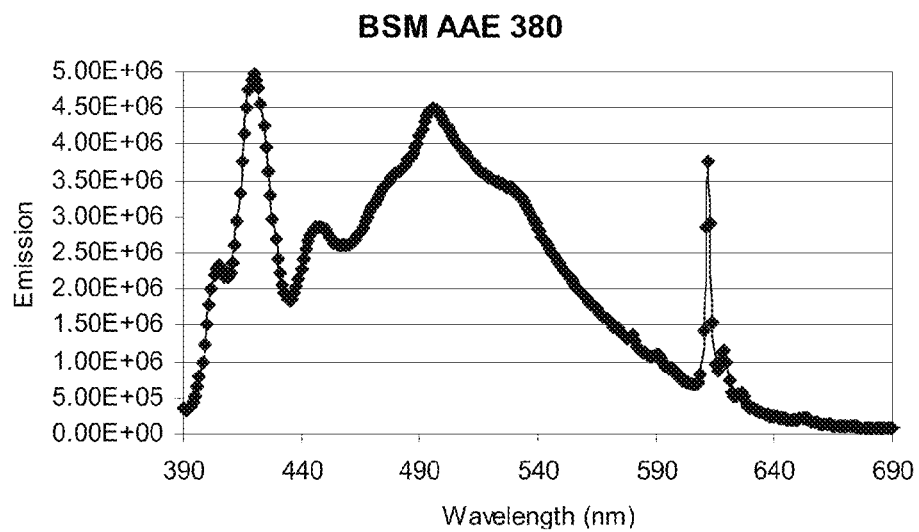

When complexes of each of the three dyes with BSM were mixed in an aqueous solution, the emission spectrum of FIG. 14 was obtained, preserving all the three peaks, with the FRET effect being substantially diminished, if existing at all.

Figure 15:
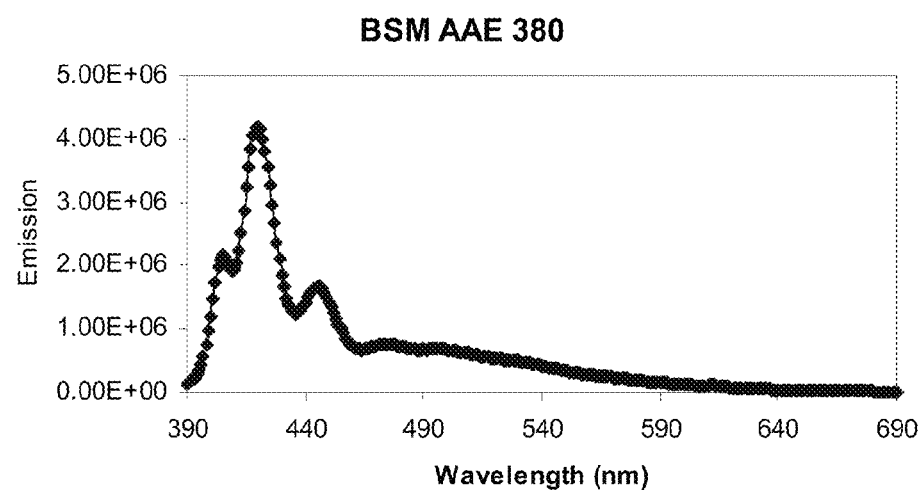

When BSM was added to a mixture of the three dyes, only blue emission was observed (FIG. 15). Without wishing to be bound to theory, it is assumed that molecules of different dyes were captured by the BSM in a manner that allowed energy transfer between them, resulting in the FRET effect.

White OLED

A white light emitting diode (LEDs) based on complexes of dyes with sugar substituted polypeptide has been prepared. The diode was prepared in a conventional way, by deposition of an anode material onto a substrate, coating the anode material with a layer of the mucin-dye complex, and depositing on the complex layer cathode material.

In certain embodiments, the substrate was glass, the anode material was ITO (indium-tin-oxide), and the cathode was made of a first layer of aluminum, an intermediate layer of titanium, and an outer layer of gold, which functions as a contact to the diode.

In such embodiments, the ITO, aluminum, titanium, and gold were deposited, each in its turn, using vapor deposition and the organic layer was coated on the ITO using spin coating or dip coating.

It was found advantageous to deposit a layer of conductive polymers between the organic layer and the cathode and between the organic layer and the anode. The organic layers employed were of PEDOT:PSS (Poly(3,4-ethylenedioxythiophene)poly(styrenesulfonate)).

The dyes employed were anthracene, aluminum complex and Eu complex, and it is expected that when a layer containing a mixture of the complexes of each of these three with mucin, applying a voltage between the anode and the cathode will result in emission of white light.

Bucky Films (e.g., $C_{60}$)

It was found that when a drop of aqueous (or other) colloid of a complex of $C_{60}$ with sugar substituted polypeptide (mucin) is dried on a substrate, it leaves a film of the mucin-nano structure complex.

Figure 16:
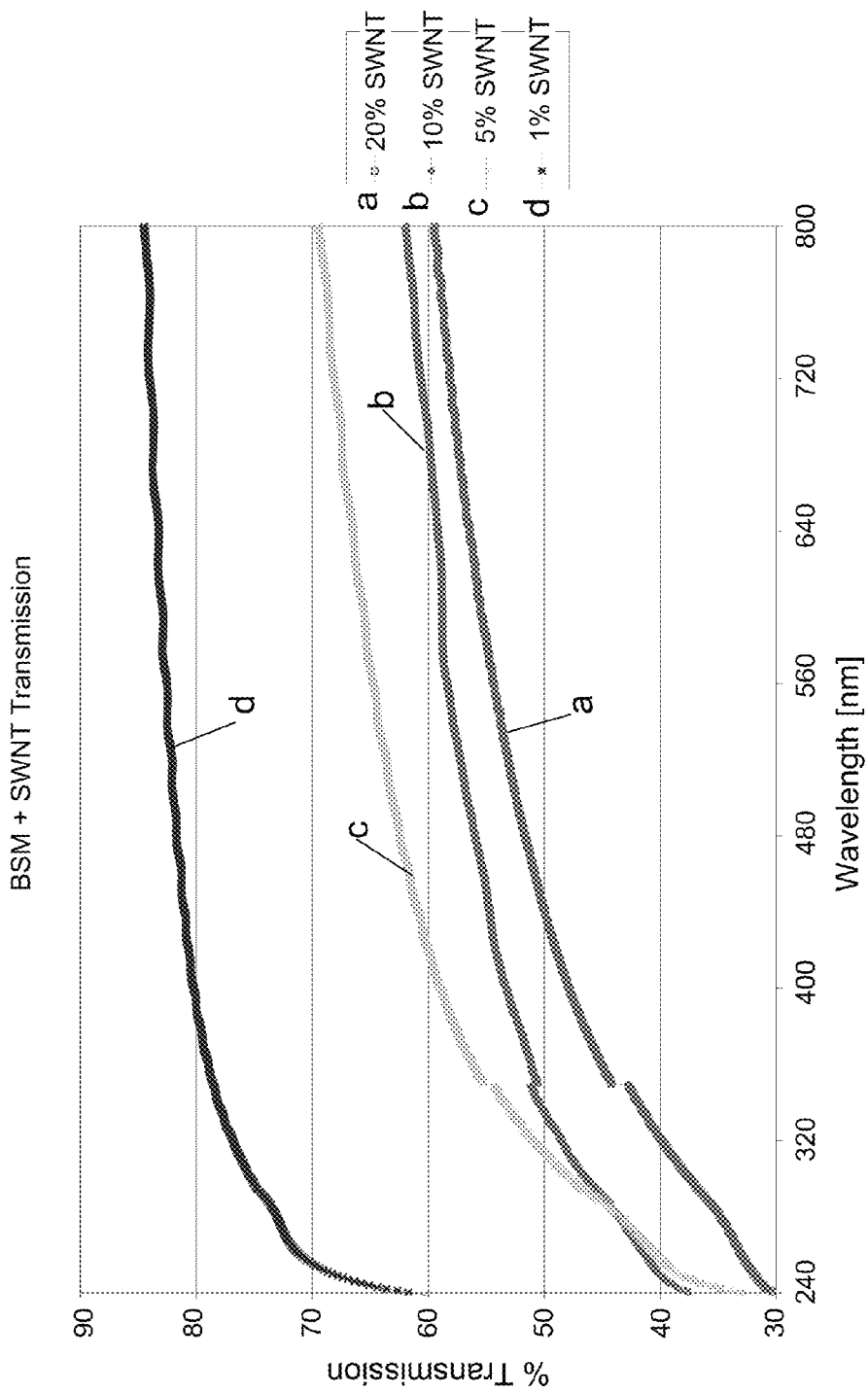

FIG. 16 shows the transmission spectra of films on quartz substrate. The films are of single wall carbon nanotubes complexed with BSM. After incubation of the BSM with the nanotubes, the obtained colloid was filtered on cotton-wool to remove non-captured nanotubes, and a drop of filtered colloid was placed on a quartz plate, and let dry in a hood. The weight ratio between the nanotubes and the BSM in the colloid (before filtration) were 1%, 5%, 10%, and 20%, with the highest nanotube concentration resulting in lowest light transmission. The width of the dry layer of mucin-nanotube complex is estimated in about 3 to 7 micrometers.

Figure 17:
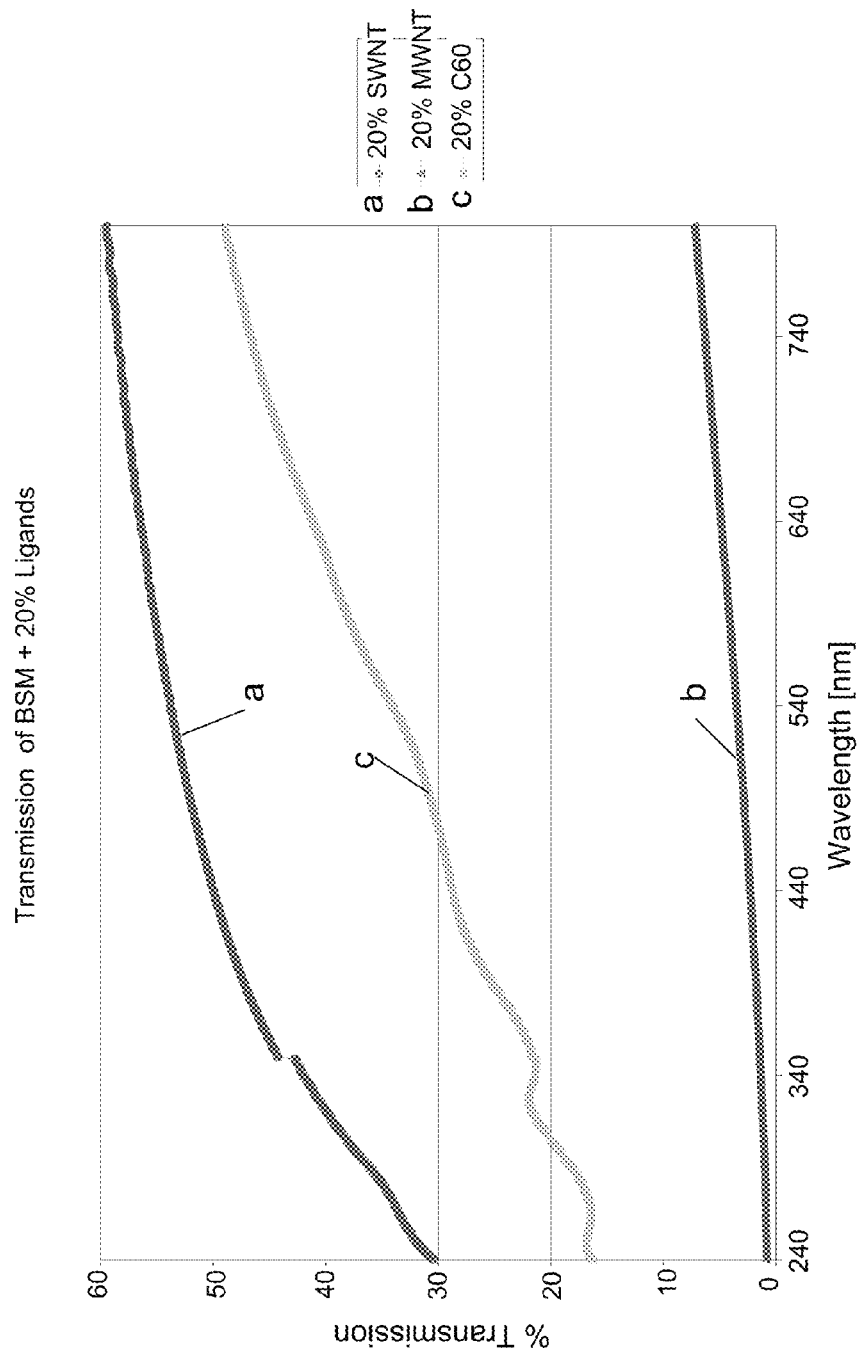

FIG. 17 shows the transmission spectra of films made of single wall carbon nanotubes, multi wall carbon nanotubes, and $C_{60}$, each complexed with BSM. The ligand to mucin weight ratio in the colloid before filtration was 20% in all three samples. As can be seen, most transparent films were obtained with single wall nanotubes, the least transparent films were obtained with multi wall nanotubes, and films made of fullerene-mucin complexes had an intermediate transparency.

It was found that all these films may be pilled off the substrate to make stand alone films.

FIG. 18 shows the UV-Vis spectra of four stand alone films of mucin-$C_{60}$ complexes, where the $C_{60}$ to mucin ratio is 1%, 5%, 10%, and 20%. The spectra show a broad absorption band at about 345 nm, which is most pronounced in the spectrum of the 20% film (the film of highest absorption), and is less pronounced as the concentration decreases, and does not exist in the spectrum of the 1% film. The 345 nm peak is attributable to large aggregates of fullerene (of about 1 micrometer or more). Therefore, it may be assumed that fullerene tends to complex with the mucine predominantly in aggregated form, and less so, if at all as single molecules.

FIG. 19 shows the UV-Vis spectra of four mixtures of mucin-$C_{60}$ complexes, where the $C_{60}$ to mucin ratio is 1%, 5%, 10%, and 20%. The solutions of FIG. 19 are the dried to obtain the films of FIG. 18. The 345 nm peak attributable to the fullerene clusters appears in the solution spectra similarly to its appearance in film spectra, which may indicate that drying of the solution does not change the aggregation of the complexes fullerene.

Materials and Methods

Materials.

Prior to incubation with ligands, bovine submaxillary mucin, type I (Aldrich) was dialyzed with Spectra/Por Float-A-Lyzer membrane (with molecular weight cut-off 100,000 Da). $C_{60}$ was purchased from SesRes and IF-WS$_2$ was kindly donated by Prof, Reshef Tenne. Other fine chemicals and solvents of analytical grade were purchased from Sigma-Aldrich.

UV-Visible Spectroscopy.

The UV-visible spectra were measured on a Cary 5000 (Varian) or with Agilent 1100 diode array detector (during chromatography). All UV-vis spectra were recorded in the 200-800 nm (1.0 nm steps) spectral range with baseline correction.

Fluorescence Spectroscopy.

Fluorescence spectra were measured on a Fluorolog-322 spectrometer (Jobin Yvon). Excitation-emission 3D spectra were processed and visualized by using Matlab software. All fluorescence spectra were recorded in the 280-700 nm excitation range and 290-800 nm emission range (with 1.0 nm steps for 2D and 5 nm steps for 3D spectra). The fluorescence measurements of ligands in chloroform and complexes in buffer were performed with the same UV-vis absorption intensity of chromophore (about 0.1 absorption units).

Size-Exclusion Liquid Chromatography.

Size-exclusion liquid chromatography was performed on an Agilent 1100 chromatograph equipped with a diode-array detector using a 7.5 mm×3.0 cm TSK-gel SW4000 column (Tosoh Bioscience). Sodium phosphate buffer (100 mM, pH 7.2) with sodium chloride (100 mM) was used as an isocratic eluent at a flow rate of 0.8 mL min$^{-1}$.

Dynamic Light Scattering.

Samples of BSM, deglycosylated BSM proteins or their purified complexes (2 mg mL$^{-1}$) in sodium phosphate buffer (20 mM, pH 7.2) were measured (3×1 min runs) on a high-performance particle size analyzer ALV-NIBS/HPPS (ALV-Laser Vertriebsgesellschaft), thermostated at 25° C. The particle size was calculated using the auto-correlation function of the ALV software.

Scanning Transmittance Electron Microscopy.

Samples of BSM protein or purified complexes (1 mg mL$^{-1}$) in sodium phosphate buffer (20 mM, pH 7.2) were deposited on a holey carbon-formvar support (SPI) and imaged on the Quanta 200 FEG microscope operating at 20 kV with Everhart Thornley Detector (ETD) or with a solid-state STEM detector (SSD). Chemical composition of samples was further analyzed by Oxford-INCA energy dispersive spectroscopy (EDS) system for presence of heavy elements.

Atomic Force Microscopy.

Samples of BSM protein or purified complexes (1 µg mL$^{-1}$, 5 µL) in sodium phosphate buffer (2 mM, pH 7.2) with NiCl$_2$ (2 mM) were deposited on a freshly cleaved mica surface for 15 minutes. Deposition was followed by rinsing with distilled water and drying with nitrogen. Samples were imaged on NanoScope IV AFM (Veeco) using soft non-conductive, rectangular SiN cantilevers (NSC15, Mikromasch) with spring constant of 5.5 to 22.5 N·m$^{-1}$ and resonance frequencies from 190 to 325 KHz in a tapping mode. Images (512×512 pixels) were recorded with a scan size of 5×5 µm at a scan rate of 1 Hz. The raw data was processed using WSxM software (Nanotec Electronica).

Preparation of Deglycosylated BSM Protein.

A solution of BSM protein (100 mg) in NaOH (0.1 M, 10 mL) was stirred at room temperature for 30 min. The resulting solution was cooled to 4° C. NaIO4 (100 mM) in acetate buffer (100 mM, pH 4.5) was added and the mixture was stirred overnight at 4° C. After that time, glycine (200 mg) was added and the reaction mixture was allowed to warm to room temperature and was stirred for 30 min. NaOH (1.0 M, 1 mL) was added and the solution was stirred for an additional 30 min. The resulting solution was dialyzed against deionized water overnight and was then centrifuged and lyophilized. The degree of deglycosylation was measured by using a standard periodic acid/Schiff assay (Sigma-Aldrich).

Preparation of Complexes of BSM and Deglycosylated BSM Proteins $C_{60}$-Fullerene, Multiwall Carbon Nanotubes and WS$_2$ Inorganic Fullerene Ligands.

To a solution of BSM or deglycosylated BSM protein (4 mg mL$^{-1}$, 1.5 mL) in sodium phosphate buffer (2 mM, pH 7.2) a solid ligand (1 mg) was added at room temperature and the mixture was stirred at 500-700 rpm for 48 hrs. After that time, the reaction mixture was filtered through a 0.45 µm filter and the solution was loaded on a Sephadex G-25 gel-permeation column (Pharmacia Biotech). Protein complexes were eluted with a sodium phosphate buffer (20 mM, pH 7.2) and elution was monitored by UV-vis spectroscopy.

Analysis of Complex Compositions.

The amount of BSM or deglycosylated BSM protein in complexes was determined by using a standard periodic acid/Schiff assay (Sigma-Aldrich). The amount of a ligand in each complex was determined by UV-vis spectroscopy after protein hydrolysis and quantitative extraction of the ligand by chloroform. To a sample of complex in a sodium phosphate buffer (1 mL, 20 mM, pH 7.2), chloroform (1 mL) and hydrochloric acid (1 mL, 12 M) were added at room temperature. The reaction mixture was sealed in a glass pressure vessel and heated at 80° C. with vigorous stirring for 3 hrs. After cooling to a room temperature, the organic phase containing extracted ligand was analyzed by UV-vis spectroscopy.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A composition of matter comprising a first association product of a first interactable material with a first shielding agent, said first association product having a first optical profile; a second association product of a second interactable material with a second shielding agent, said second association product having a second optical profile; and optionally a further interactable material, said further interactable material being optionally associated with a shielding agent to form a further association product having an optical profile being different from the first and second optical profiles; wherein a combination has an optical profile being substantially an accumulation of the optical profiles of each of said association products present in the composition;

wherein each of said first, second, and further shielding agents being selected independently amongst solubilizing agents capable of rendering each of said first, second, and further materials water soluble; said solubilizing agents comprising a polypeptide backbone, bound to sugar units.

2. The composition according to claim 1, wherein each of said first, second, and further interactable materials has an optical and/or electronic profile which is distinct from each of the other materials in the composition.

3. The composition according to claim 1, comprising three or more interactable materials, each of said three or more materials being independently chemically associated with a shielding agent.

4. The composition according to claim 1, comprising three interactable materials, each of said interactable materials being independently chemically associated with a shielding agent.

5. The composition according to claim 1, comprising three interactable materials, two of said materials each independently being chemically associated with a shielding agent.

6. The composition according to claim 2, wherein each of said two or more interactable materials is selected amongst hydrophobic materials.

7. The composition according to claim 6, wherein each of said two or more interactable materials, independently of the other, is selected from the group consisting of nano structures and chromophores.

8. The composition according to claim 7, wherein each of said two or more interactable materials, independently of the other, is a chromophore.

9. The composition according to claim 8, wherein said chromophore is selected from the group consisting of a polycyclic aromatic dye, a fluorescent monomer, a fluorescent polymer, a metal complex dopant and dye, a light emitting dopant and a fluorescent dye, a phthalocyanine, and a porphyrine.

10. The composition according to claim 9, wherein said chromophore is one or more of anthracene, tris(benzoylacetonato)mono(phenanthroline)europium(III) and tris-(8-hydroxyquinoline)aluminium.

11. The composition according to claim 1, wherein said first association product is of anthracene and a shielding agent, said second association product is of tris(benzoylacetonato)mono(phenanthroline)europium(III) and a shielding agent, and wherein said further association product is of tris-(8-hydroxyquinoline)aluminium and a shielding agent.

12. The composition according to claim 1, wherein said solubilizing agent is a glycoprotein or a proteoglycan.

13. The composition according to claim 12, wherein said glycoprotein is at least one glycoprotein selected from the group consisting of mucin and transferrin.

14. The composition according to claim 13, wherein said glycoprotein is mucin.

15. The composition according to claim 1, wherein said first association product is of anthracene and mucin, said second association product is of tris(benzoylacetonato)mono(phenanthroline)europium(III) and mucin, and wherein said further association product is of tris-(8-hydroxyquinoline)aluminium and mucin.

16. The composition according to claim 1 being in a form selected from solid, an aqueous solution, a non-aqueous solution, and a film.

17. The composition according to claim 16, being in the form of an aqueous solution.

18. A device comprising a film comprising a composition according to claim 1; and optionally further comprising an electrode assembly; said device having a monolayered or multilayered structure.

19. The device according to claim 18, being selected from the groups consisting of a sensor, a humidity sensor, a light emitting diode, a solar cell, a photovoltaic cell, a light transducer, and a tag.

20. The device according to claim 18, being a multicolored organic light emitting diode (OLED).

21. The device according to claim 20, comprising a film of a composition according to claim 1, the composition being a light emitting and/or carrier-transporting medium.

22. The device according to claim 20, being a multilayered OLED having a sandwich-like structure comprising a cathode; at least one film of a composition according to claim 1; and an anode.

23. The device according to claim 22, wherein said OLED being covered or encapsulated with a protecting layer.

24. The device according to claim 18, wherein the composition comprises three association products, each being of a material and mucin, one of said materials emitting in the red region of the electromagnetic spectrum, the second material emitting in the green region of the electromagnetic spectrum and the third emitting in the blue region of the electromagnetic spectrum.

25. A solid film comprising a composition according to claim 1.

26. The film according to claim 25, comprising a material emitting in the red region of the electromagnetic spectrum, a material emitting in the green region of the electromagnetic spectrum and a material emitting in the blue region of the electromagnetic spectrum, each of said materials being chemically associated with mucin.

27. A method of preparing a composition according to claim 1, the method comprising obtaining a water solution of at least one shielding agent, and adding thereto at least one material to obtain an association product between each of said at least one materials and said at least one shielding agents.

28. A method of preparing a solid film of a composition according to claim 1, the method comprising applying a solution comprising a composition according to claim 1 on at least a portion of a surface of a substrate, and drying the solvent of the applied solution to thereby obtain a film on said at least a portion of the surface.

* * * * *